(12) United States Patent
Varnas

(10) Patent No.: US 8,833,936 B2
(45) Date of Patent: Sep. 16, 2014

(54) OPHTHALMIC LENS ELEMENT

(75) Inventor: Saulius Raymond Varnas, Brighton (AU)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

(21) Appl. No.: 13/508,696

(22) PCT Filed: Nov. 9, 2010

(86) PCT No.: PCT/AU2010/001486
§ 371 (c)(1),
(2), (4) Date: Jun. 25, 2012

(87) PCT Pub. No.: WO2011/054058
PCT Pub. Date: Dec. 5, 2011

(65) Prior Publication Data
US 2012/0257161 A1 Oct. 11, 2012

(30) Foreign Application Priority Data
Nov. 9, 2009 (AU) .................................. 2009905468

(51) Int. Cl.
G02C 7/06 (2006.01)
(52) U.S. Cl.
CPC .................. *G02C 7/066* (2013.01); *G02C 7/061* (2013.01)
USPC ................ 351/159.42; 351/159.4; 351/159.41
(58) Field of Classification Search
USPC ................ 351/159.1, 159.12, 159.14, 159.16, 351/159.41, 159.42, 159.78, 159.79
See application file for complete search history.

(56) References Cited

U.S. PATENT DOCUMENTS

| 4,954,591 A | 9/1990 | Belmares |
| 5,704,692 A | 1/1998 | Purdy et al. |

(Continued)

FOREIGN PATENT DOCUMENTS

| CN | 101288017 A | 10/2008 |
| CN | 101317121 A | 12/2008 |

(Continued)

OTHER PUBLICATIONS

International Search Report (PCT/ISA/210) issued on Jan. 28, 2011, by the Australian Patent Office as the International Searching Authority for International Application No. PCT/AU2010/001486.

(Continued)

*Primary Examiner* — Ricky Mack
*Assistant Examiner* — William Alexander
(74) *Attorney, Agent, or Firm* — Buchanan Ingersoll & Rooney

(57) ABSTRACT

A progressive ophthalmic lens element is disclosed. The progressive ophthalmic lens element includes an upper viewing zone, a lower viewing zone, a corridor, and a peripheral region disposed on each side of the lower viewing zone. The upper viewing zone includes a distance reference point (DRP) and a fitting cross, and provides a first refractive power for distance vision. The lower viewing zone, which is for near vision, provides an addition power relative to the first refractive power. The corridor connects the upper and lower zones and provides a refractive power varying from that of the upper viewing zone to that of the lower viewing zone. Each peripheral region includes a zone of positive power relative to the addition power which provides therein a positive refractive power relative to the refractive power of the lower viewing zone. The zones of relative positive power are disposed immediately adjacent to the lower viewing zone such that the lower viewing zone interposes the zones of relative positive power.

21 Claims, 16 Drawing Sheets

(56) References Cited

U.S. PATENT DOCUMENTS

| | | | |
|---|---|---|---|
| 6,343,861 B1* | 2/2002 | Kris et al. | 351/159.42 |
| 6,709,105 B2* | 3/2004 | Menezes | 351/159.42 |
| 6,712,467 B1 | 3/2004 | Kitani | |
| 6,793,340 B1* | 9/2004 | Morris et al. | 351/159.42 |
| 8,256,895 B2* | 9/2012 | Del Nobile | 351/159.42 |
| 2005/0083482 A1* | 4/2005 | Miller et al. | 351/169 |
| 2007/0103640 A1 | 5/2007 | Chauveau et al. | |
| 2008/0002150 A1* | 1/2008 | Blum et al. | 351/169 |
| 2009/0257026 A1 | 10/2009 | Varnas et al. | |
| 2009/0310082 A1 | 12/2009 | Varnas | |
| 2010/0208197 A1 | 8/2010 | Carimalo et al. | |

FOREIGN PATENT DOCUMENTS

| WO | WO 2007/041796 A1 | 4/2007 |
|---|---|---|
| WO | WO 2008/031166 A1 | 3/2008 |

OTHER PUBLICATIONS

D. Mutti et al., "Peripheral Refraction and Ocular Shape in Children", Investigative Ophthalmology & Visual Science, Apr. 2000, pp. 1022-1030, vol. 41, No. 5.

E. Smith III et al., "Peripheral Vision Can Influence Eye Growth and Refractive Development in Infant Monkeys", Investigative Ophthalmology & Visual Science, Nov. 2005, pp. 3965-3972, vol. No. 11.

E. Smith III et al., "Effects of Foveal Ablation on Emmetropization and Form-Deprivation Myopia", Investigative Ophthalmology & Visual Science, Sep. 2007, pp. 3914-3922, vol. 48, No. 9.

S. Hasebe et al., "Effect of Progressive Addition Lenses on Myopia Progression in Japanese Children: A Prospective, Randomized, Double-Masked, Crossover Trial", Investigative Ophthalmology & Visual Science, Jul. 2008, pp. 2781-2789, vol. 49, No. 7.

Z. Yang et al., "The effectiveness of progressive addition lenses on the progression of myopia in Chinese children", Opthal. Physiol. Opt., 2009 (month unknown), pp. 41-48, vol. 29, No. 1.

J. Gwiazda et al., "A Randomized Clinical Trial of Progressive Addition Lenses versus Single Vision Lenses on the Progression of Myopia in Children", Investigative Ophthalmology & Visual Science, Apr. 2003, pp. 1492-1500, vol. 44, No. 4.

R. Walker and D. Mutti, "The Effect of Accommodation on Ocular Shape", Optometry and Vision Science, Jul. 2002, pp. 424-430, vol. 79, No. 7.

K. Rose et al., "Outdoor Activity Reduces the Prevalence of Myopia in Children", Ophthalmology, Aug. 2008, pp. 1279-1285, vol. 115, No. 8.

H. Guo et al., "changes in through-focus spatial visual performance with adaptive optics correction of monochromatic aberrations", Vision Research, 2008 (month unknown), pp. 1804-1811, vol. 48, No. 17.

Theo. E. Obrig, A.B., "Modern Ophthalmic Lenses and Optical Glass", 1944 (month unknown), pp. 260-271, Third Edition.

Examination Report dated May 8, 2013, in the corresponding Chinese Patent Application No. 201080056869.8, and an English Translation thereof. (11 pages).

* cited by examiner

OPHTHALMIC LENS ELEMENT

This application claims priority from Australian Provisional Patent Application No. 2009905468 filed on 9 Nov. 2009, the contents of which are to be taken as incorporated herein by this reference.

FIELD OF INVENTION

The present invention relates to ophthalmic lens elements for retarding or arresting progression of myopia.

BACKGROUND OF THE INVENTION

To provide focussed vision, an eye must be capable of focusing light on the retina. An eye's ability to focus light on the retina depends, to a large extent, on the shape of the eyeball. If an eyeball is "too long" relative to its "on-axis" focal length (meaning, the focal length along the optical axis of the eye), or if the outside surface (that is, the cornea) of the eye is too curved, the eye will be unable to properly focus distant objects on the retina. Similarly, an eyeball that is "too short" relative to its on-axis focal length, or that has an outside surface which is too flat, will be unable to properly focus near objects on the retina.

An eye that focuses distant objects in front of the retina is referred to as a myopic eye. The resultant condition is referred to as myopia, and is usually correctable with appropriate single-vision lenses. When fitted to a wearer, conventional single-vision lenses correct myopia associated with central vision. Meaning that, conventional single-vision lenses correct myopia associated with vision that uses the fovea and parafovea. Central vision is often referred to as foveal vision.

Although conventional single-vision lenses may correct myopia associated with central vision, it is known that off-axis focal length properties of the eye often differ from the axial and paraxial focal lengths (Ferree et al. 1931, Arch. Ophth. 5, 717-731; Hoogerheide et al. 1971, Ophthalmologica 163, 209-215; Millodot 1981, Am. J. Optom. Physiol. Opt. 58, 691-695). In particular, myopic eyes tend to display less myopia in the retina's peripheral region as compared with its foveal region. This is often referred to as a peripheral hyperopic shift of the image. This difference may be due to a myopic eye having a prolate vitreous chamber shape.

Indeed, a United States study (Mutti et al. 2000, Invest. Ophthalmol. Vis. Sci., 41: 1022-1030) observed that the mean (±standard deviation) relative peripheral refractions at 30° field angle in myopic eyes of children produced +0.80±1.29 D of spherical equivalent.

Interestingly, studies with monkeys have indicated that a defocus in peripheral retina alone, with the fovea staying clear, can cause an elongation of the foveal region (Smith et al. 2005, Invest. Ophthalmol. Vis. Sci. 46: 3965-3972; Smith et al. 2007, Invest. Ophthalmol. Vis. Sci. 48, 3914-3922) and the consequent myopia.

On the other hand, epidemiological studies have shown the presence of correlation between myopia and near work. It is well known that the prevalence of myopia in the well educated population is considerably higher than that for unskilled labourers. Prolonged reading has been suspected of causing a hyperopic foveal blur due to insufficient accommodation. This has led many eye care professionals to prescribing progressive addition or bi-focal lenses for juveniles manifesting progression of myopia. Special progressive lenses have been designed for use by children (U.S. Pat. No. 6,343,861). The therapeutic benefit of these lenses in clinical trials has been shown to be statistically significant in retarding progression of myopia but clinical significance appears to be limited (e.g. Hasebe et al. 2008, Invest. Ophthalmol. Vis. Sci. 49(7), 2781-2789; Yang et al. 2009, Ophthalmic Physiol. Opt. 29(1), 41-48; and Gwiazda et al., 2003, Invest. Ophthalmol. Vis. Sci., Vol. 44, pp. 1492-1500). However, Walker and Mutti (2002), Optom. Vis. Sci., Vol. 79, pp. 424-430, have found that accommodation also increases the relative peripheral refractive error, possibly due to the increased choroidal tension during accommodation pulling the peripheral retina inward.

It is believed that one trigger for myopia progression involves an eye growth signal which compensates for hyperopic defocusing on the peripheral retina, even in circumstances where foveal vision is well corrected.

To correct for both foveal and peripheral vision errors at least two zones of different lens powers are required on the same lens, namely, a central zone or aperture of constant minus power to correct foveal vision, and a peripheral zone of relatively plus power which surrounds the central zone to correct peripheral vision errors. The size of the central zone, the start of the peripheral zone, and the transition between the central zone and the peripheral zone may be varied. For example, the size of the central zone may be adapted according to the typical extent of habitual eye rotation. This may mean, for example, that the central zone may need to have a diameter of between about 10 mm and 20 mm on the lens surface. Typically, 0.5 D to 2.0 D of relatively plus power may be provided in the peripheral zone.

One approach for providing a "power transition" between the central zone of constant minus power and the peripheral zone of relatively plus power involves providing an "instant" transition of the type described in international patent publication WO2007041796. However, such a transition may present undesirable "double vision" type effects to a moving eye.

An alternative approach for providing a power transition between the central zone of constant minus power and the peripheral zone of relatively plus power involves providing a "smooth" aspheric design which introduces a transition or progressive power zone between the central zone and the peripheral zone, as opposed to providing an "instant" power transition. For example, it is known to provide a rotationally symmetric transition zone. However, providing a rotationally symmetric transition zone may introduce a considerable amount of astigmatism which may cause undesirable astigmatic blur on the peripheral retina.

The aspheric single vision lens described in WO2007041796 corrects peripheral hyperopic shift for both distance and near vision. However, hyperopic blur for distance vision typically extends over the entire width of the lens aperture. On the other hand, the hyperopic blur for near vision often extends over a smaller aperture corresponding to the angular size of the near object being viewed, such as a book. Also many near vision tasks, such as reading, demand a far smaller extent of eye rotations than those for many distance vision tasks. Therefore, one would expect that lenses for correcting peripheral hyperopic shift for distance vision would have different requirements than those for correcting peripheral hyperopic shift for near vision, in terms of the size of the central zone and the location and extent of the peripheral zone. One way of addressing the differing requirements is to provide two pairs of lenses, one for the distance vision requirements, the other for near vision requirements. However providing two pairs of lenses is often impractical.

Another approach involves providing an adapted progressive addition lens. A progressive addition lens provides a relatively large upper viewing zone for distance vision tasks, a relatively narrower lower viewing zone having a different surface power from the upper viewing zone to achieve a refracting power corresponding to near vision, and an intermediate zone (or corridor) which extends between the upper viewing zone and the lower viewing zone and provides a power progression there between. In this respect, U.S. Pat. No. 6,343,861 discloses a progressive addition lens having a very short power progression and a relatively large upper and lower viewing zones for viewing distant and near objects respectively.

International patent publication WO2008031166 discloses a progressive addition lens having a relatively plus power in the periphery of the lens which corresponds with the addition power of the lower viewing zone. The lens disclosed in WO2008031166 may introduce a myopic shift on the peripheral retina during distance vision tasks. However, it will not provide effective control of the location of the peripheral image during near vision tasks since the peripheral area of the lower viewing zone, at least in the immediate vicinity of the lower viewing zone, has a lower mean refracting power compared to the central portion of the lower viewing zone and thus does not provide the required relative plus power.

A recent study (Rose et al. 2008, Ophthalmology, Vol. 115, Issue 8, 1279-1285) suggests that juveniles spending more time outdoors, and who, if they are myopes, would mostly experience peripheral hyperopic shift in an unaccommodated eye, show a relatively low tendency of myopia progression. It has been suggested that hyperopic defocus in the periphery of the retina in the presence of positive spherical aberration characterising a normal relaxed eye may not lead to a significant reduction in contrast to trigger the eye growth mechanism. Indeed, measurements and simulations of contrast for different values and signs of defocus for a relaxed eye by Guo et al. (2008), Vision Res. 48, 1804-1811 show the positive (myopic) defocus to be more damaging to contrast on the retina than the hyperopic defocus typically experienced in the peripheral retina by a relaxed myopic eye. It is thought that this is the consequence of interaction between defocus and positive spherical aberration of the relaxed eye. It has been suggested that spherical aberration of the eye may provide a cue for detecting the sign of defocus (Wilson et al. 2002, J. Opt. Soc. Am. A 19(5), 833-839). It is also known that the spherical aberration of the accommodated myopic eye becomes negative (Collins et al. 1995, Vision Res. 35(9), 1157-1163). This would lead to a very different effect of hyperopic defocus on the image contrast in near vision compared to distance vision.

In view of the above, existing ophthalmic spectacle lenses for correcting myopia which provide relatively large central zones of constant power, as proposed in WO 2007041796, may thus fail to remove stimuli for myopia progression for near vision tasks. It would thus be desirable to provide a progressive addition lens which compensates for the peripheral hyperopic shift during near vision tasks while simultaneously providing clear distance vision over a relatively wide aperture field.

The discussion of the background to the invention herein is included to explain the context of the invention. This is not to be taken as an admission that any of the material referred to was published, known or part of the common general knowledge as at the priority date of any of the claims

SUMMARY OF THE INVENTION

The present invention provides an ophthalmic lens element including an upper viewing zone providing a first refractive power for distance vision, a lower viewing zone providing an addition power relative to the first refractive power, and peripheral regions including a respective zone of relatively positive power compared to the addition power. The lower viewing zone and the peripheral regions are arranged so that the lower viewing zone interposes the zones of relatively positive power.

Preferably, the combined horizontal extent of the zones of relatively positive power and the lower viewing zone corresponds to a typical horizontal angular extent of the object field for a near object, such as a book or a magazine.

In one aspect, the present invention provides a progressive ophthalmic lens element including:

an upper viewing zone having a distance reference point and a fitting cross, the upper viewing zone providing a first refractive power for distance vision;

a lower viewing zone for near vision, the lower viewing zone providing an addition power relative to the first refractive power;

a corridor connecting the upper and lower zones, the corridor having a refractive power varying from that of the upper viewing zone to that of the lower viewing zone; and a peripheral region disposed on each side of the lower viewing zone, each peripheral region including a zone of positive power relative to the addition power to provide therein a positive refractive power relative to the refractive power of the lower viewing zone;

wherein the zones of relative positive power are disposed immediately adjacent to the lower viewing zone such that the lower viewing zone interposes the zones of relative positive power.

Preferably, the lower viewing zone is a relatively narrow zone of low surface astigmatism. In this respect, the lower viewing zone may be defined by 0.5 D contours of astigmatism disposed below a near reference point. In an embodiment, the maximum horizontal extent of the lower viewing zone, and thus the maximum distance between the 0.5 D contours of astigmatism, is less than about 12 mm.

The addition power (or "Add") will typically be expressed in terms of a desired mean addition value. A mean addition power in the range of 0.50 D to 3.00 D may be used.

The zones of relatively "positive power" in the peripheral regions each provide a relatively positive difference in refractive power relative to the first refractive power. The positive difference between the refractive power in the zones of relatively "positive power" in the peripheral regions relative to the first refractive power is greater than the addition power of the lower viewing zone and thus provides a "positive power" relative to the addition power. Accordingly, the zones of relatively positive power may thus also be considered as providing an addition power which is greater than the addition power of the lower viewing zone.

Providing a relatively narrow lower viewing zone allows each zone of relative positive power to be positioned in relative close proximity to a centre line extending substantially vertically through the lower viewing zone, and thus provide a relatively narrow combined horizontal extent of the zones of relatively positive power and the lower viewing zone. Preferably, the maximum combined horizontal extent of the zones of relatively positive power and the lower viewing zone is less than about 30 mm.

Embodiments of the present invention may compensate for a peripheral hyperopic shift during near vision tasks and thus may provide an optical correction for retarding or arresting myopia progression for a wearer during near viewing activities.

In some embodiments the lower viewing zone may include a near reference point. The location of the near reference point (NRP) may be indicated using a marking on a surface of the lens element. However, it is not essential that the lens element include such a marking.

Embodiments of the present invention may provide a horizontal or lateral mean addition power profile along a horizontal line disposed below the near reference point, said line extending across the lower viewing zone and the peripheral regions. The horizontal or lateral mean addition power profile may exhibit a respective peak magnitude in each peripheral region and a local minimum magnitude in the lower viewing zone. Preferably, each local minimum magnitude is disposed at the intersection of the horizontal line and a line fitted to a set of horizontal mid-points between nasal and temporal 0.5 D astigmatism contours adjacent to the lower viewing zone. Fitting the line to the horizontal mid-points may involve suitable approximation techniques, such as a least squares type approximation. Other suitable techniques would be well understood to a skilled reader. The fitted line may be a substantially vertical line or it may be tilted or inclined to align with the eye-path of the wearer.

The respective peak magnitudes of the mean addition power may be laterally separated from the fitted line by between about 10 mm and about 15 mm.

The first refractive power is typically a prescribed power that corresponds with an optical correction for a wearer's distance vision requirements. Thus, for the remainder of the specification, references to a "distance viewing zone" are to be understood as a reference to the upper viewing zone. On the other hand, the addition power of the lower viewing zone may be selected to ease the accommodative demand and shift the image plane in the periphery closer to, or in front of, the retina during near vision tasks. Thus, for the remainder of the specification, references to a "near viewing zone" are to be understood as a reference to the lower viewing zone.

The lower viewing zone will be positioned in a region of the progressive ophthalmic lens element that is likely to be used for near vision. The lower viewing zone may be inset towards a nasal side of the lens relative to the distance viewing zone.

A progressive ophthalmic lens element according to an embodiment of the present invention may be specifically designed for juvenile use since juveniles typically do not have a need for near vision correction due to the availability of the accommodation of the eye to view objects in the near field. For example, a juvenile may be able to use the distance viewing zone to view near objects with the help of their accommodation system. However, including the lower viewing zone of addition power may assist juvenile wearers in reducing their accommodative demand and thus lower the central blur on the fovea and parafovea during near viewing tasks due to accommodative lag. The provision of the zones of relative positive or "plus" power adjacent to the lower viewing zone may also reduce hyperopic blur in the immediate peripheral vision during near viewing tasks, such as reading, where the near object occupies a relatively large horizontal angular extent of the wearer's visual field, and is thus extended in object space. By way of example, a mobile phone's screen, for example, would typically not occupy a large horizontal angular extent of the wearer's visual field, and is thus not "extended in object space" when compared to, for example, a book or a magazine.

Therefore, embodiments of the present invention may be more effective in retarding or even arresting progression of myopia, particularly in children, than prior myopia control lenses.

The distance viewing zone of the progressive ophthalmic lens element may be designed to be used at relatively low to moderate minus prescribed powers. It will be appreciated that the refracting power of the distance viewing zone may vary according to a wearer's requirements, and may be in the range of, for example, plano to −6.00 D. A wide range of base curves may be used for this purpose, including the relatively flat base curves typical for minus prescriptions but also some relatively steep base curves that reduce the minus lens induced hyperopic shift in peripheral vision. For example, a base curve in the range of 0.50 D to 9.00 D may be used.

The power distribution of the zones of relatively positive power in the peripheral regions may contribute to an optical correction for correcting peripheral vision, when the wearer is viewing objects through the lower viewing zone. In use, the power distribution may provide a stimulus for retarding or arresting myopia in the form of a "stop signal" to the undesirable growth of the eye that retards or arrests myopia progression.

Thus, one embodiment of the present invention provides a progressive ophthalmic lens element that provides suitable optical corrections for a wearer's on-axis distance vision requirements over a wide range of eye rotations, and which is also capable of reducing accommodative demand for near vision tasks, whilst simultaneously providing a stop signal for retarding or arresting myopia progression that may otherwise have resulted from an eye's constant exposure to hyperopic blur in the peripheral retina during near vision.

In an embodiment, the stop signal may compensate for a varying focal plane of the wearer's eye to remove most of the hyperopic blur from the peripheral region of the retina for a primary near viewing eye position. Thus, it is expected that the distribution of the positive power through the zones of relatively positive power in the peripheral regions of a progressive ophthalmic lens element in accordance with an embodiment of the present invention will provide an optical correction that provides the stop signal for undesirable ocular growth, thus leading to retardation or arresting of myopia in the periphery of the retina.

A progressive ophthalmic lens element according to an embodiment of the present invention includes a front surface and a back surface (that is, the surface nearest the eye). The front and back surfaces may be shaped to provide suitable contours of refracting power and astigmatism for the upper viewing zone, the lower viewing zone and the corridor.

The front surface and the back surface of the lens may have any suitable shape. In an embodiment, the front surface is an aspherical surface and the rear surface is spherical or toric. In another embodiment, the front surface is a spherical surface and the rear surface is aspherical.

In yet another embodiment, both the front and rear surfaces are aspherical. It will be appreciated that an aspherical surface may include, for example, an atoric surface, a progressive surface, or combinations thereof.

The addition power of the lower viewing zone and the relatively positive power in the peripheral regions will typically correspond with different optical correction requirements of the wearer. In particular, the addition power will be selected to provide a near power which corresponds with an on-axial, or paraxial, optical correction required to provide clear vision (that is, foveal vision) for a wearer's near vision tasks with the reduced accommodative demand, whereas the peripheral power may provide an off-axis optical correction when viewing near objects through the lower viewing zone.

The positive mean power of each peripheral region may be selected based on optical correction requirements expressed in terms of clinical measurements that characterise the wearer's peripheral correction requirements, that is, the optical correction required to correct a wearer's peripheral vision.

Any suitable technique may be used to obtain those requirements including, but not limited to, peripheral Rx data or ultrasound A-Scan data. Such data may be obtained through the use of devices that are known in the art, such as an open field auto-refractor (for example, a Shin-Nippon open field auto-refractor).

As explained above, each peripheral region includes a zone which provides a positive power relative to the addition power of the lower viewing zone and thus which also provides a zone of increased refracting power relative to the refracting power of the lower viewing zone. Each zone thus provides a zone of relative positive power which provides "a plus power correction". The positive power, and thus the "plus power correction" may be in the range of about 0.50 D to 2.50 D relative to the addition power and thus relative to the refracting power of the lower viewing zone, which will usually be expressed in terms of the mean refracting power at a near reference point (NRP) of the lens element.

As explained above, the lower viewing zone is preferably a relatively narrow zone. In an embodiment the lower viewing zone may have a shape and/or size for providing a region of low surface astigmatism over a range of eye-rotations for a wearer's near vision tasks. In other words, the near or lower viewing zone may be shaped and/or sized to support a wearer's near vision requirements throughout an angular range of eye rotations.

The area of the distance viewing zone will typically be greater than the area of the lower viewing zone.

A progressive ophthalmic lens element according to an embodiment of the present invention may be formulated from any suitable material. In one embodiment a polymeric material may be used. The polymeric material may be of any suitable type, for example, it may include a thermoplastic or thermoset material. A material of the diallyl glycol carbonate type, for example CR-39 (PPG Industries) may be used.

The polymeric article may be formed from cross-linkable polymeric casting compositions. The polymeric material may include a dye, preferably a photochromic dye, which may, for example, be added to the monomer formulation used to produce the polymeric material.

A progressive ophthalmic lens element according to an embodiment of the present invention may further include standard additional coatings to the front or back surface, including electrochromic coatings.

The front lens surface may include an anti-reflective (AR) coating, for example of the type described in U.S. Pat. No. 5,704,692, the entire disclosure of which is incorporated herein by reference.

The front lens surface may include an abrasion resistant coating, for example, of the type described in U.S. Pat. No. 4,954,591, the entire disclosure of which is incorporated herein by reference.

The front and back surfaces may further include one or more additions conventionally used in casting compositions such as inhibitors, dyes including thermochromic and photochromic dyes, for example, as described above, polarising agents, UV stabilisers and materials capable of modifying refractive index.

A preferred embodiment of a lens element according to the invention provides an ophthalmic lens element having peripheral regions which include zones of positive mean power (that is, "a plus power correction") relative to the refracting power of the lower viewing zone.

The level of the plus power correction required by wearer will vary, given the large scatter in the myopic peripheral refractions found by Mutti et al. (2000).

An ophthalmic lens element according of the present invention may simultaneously and substantially correct both central and peripheral vision during near vision tasks. Correction of this type is expected to remove, or at least delay, a presumed trigger of myopia progression in myopes, particularly in myopic juveniles.

Another aspect of the present invention provides a method for retardation of myopia progression, including providing to a patient spectacles bearing a pair of progressive ophthalmic lens elements, each lens element including a surface having:

an upper viewing zone having a distance reference point and a fitting cross, the upper viewing zone providing a first refractive power for distance vision;

a lower viewing zone for near vision, the lower viewing zone providing an addition power relative to the first refractive power;

a corridor connecting the upper and lower zones, the corridor having a refractive power varying from that of the upper viewing zone to that of the lower viewing zone; and a peripheral region disposed on each side of the lower viewing zone, each peripheral region including a zone of positive power relative to the addition power to provide therein a positive refractive power relative to the refractive power of the lower viewing zone;

wherein the zones of relative positive power are disposed immediately adjacent to the lower viewing zone such that the lower viewing zone interposes the zones of relative positive power.

BRIEF DESCRIPTION OF THE DRAWINGS

The present invention will now be described in relation to various examples illustrated in the accompanying drawings. However, it must be appreciated that the following description is not to limit the generality of the above description.

In the drawings.

DETAILED DESCRIPTION OF THE DRAWINGS

Before turning to a description of embodiments of the present invention, there should be some explanation of some of the language used above and throughout the specification.

For example, the reference in this specification to the term "progressive ophthalmic lens element" is a reference to all forms of individual refractive optical bodies employed in the ophthalmic arts, including, but not limited to lenses, lens wafers and semi-finished lens blanks requiring further finishing to a particular patient's prescription.

Further, with respect to references to the term "surface astigmatism", such references are to be understood as a reference to a measure of the degree to which the curvature of the lens varies among intersecting planes which are normal to the surface of the lens at a point on the surface. The surface astigmatism is equal to the difference between the minimum and maximum curvature of the lens surface in any of those intersecting planes multiplied by (n−1), where n is the reference index of refraction.

References to the term "fitting cross" are to be understood as a reference to a marking located at a point on a surface of a lens element or a semifinished lens blank, which is stipulated by the manufacturer as a reference point for positioning the lens element in front of the wearer's eye.

References to the term "distance reference point" (DRP) are to be understood as a point on the front surface of the lens at which the refractive power for distance vision applies.

References to the term "near reference point" (NRP) are to be understood as a reference to the "highest" point (that is, the point most vertically displaced in the direction of the geometric centre of the lens) along the eye path on the front surface of the progressive lens where the required mean addition power can be measured. The NRP may be marked or designated by a marking on the surface of the lens. However, it is not essential that such a marking or designation be provided.

References to the term "eye path" are to be understood as a reference to a visual fixation locus which, when the lens element is correctly designed for the wearer, typically coincides with a locus of horizontal mid-points between nasal and temporal 0.5 D astigmatism contours when the wearer adjusts their fixation from a distant (far field) object to a close (near field) object.

References to the term "lower viewing zone" are to be understood as a reference to a zone of low astigmatism located below the near reference point. Typically the lower viewing zone will be defined by 0.5 D contours of astigmatism disposed below the near reference point.

Figure 1:
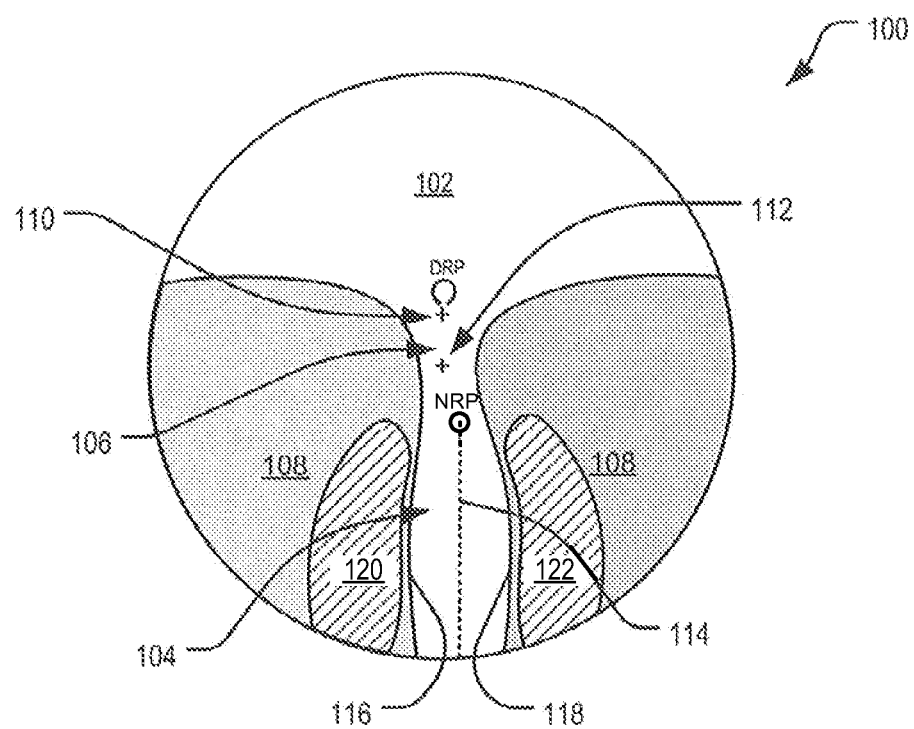
FIG. 1 is a simplified representation of an ophthalmic lens element according to an embodiment of the present invention.

FIG. 1 depicts a simplified representation of an ophthalmic lens element 100 in accordance with an embodiment of the present invention with the different zones identified for reference. FIG. 1 is simplified in as much as it is only intended to generally identify and represent the relative locations of the different zones of the ophthalmic lens element 100 using 0.5 D contours 116, 118 of astigmatism. It is to be appreciated that neither the shape of the different zones, nor their size or precise location, need to be restricted to those illustrated in FIG. 1.

The ophthalmic lens element 100 shown in FIG. 1 includes a first or upper viewing zone 102 having a first refractive power suitable for a wearer's distance vision tasks, and a second or lower viewing zone 104 providing an addition power to the first refractive power. A distance reference point (DRP) is provided in the upper viewing zone 102. A near reference point (NRP) is provided in the lower viewing zone 104. The lens element also includes a fitting cross (FC) 110 and a geometric centre (GC) 112.

A corridor 106 connects the upper 102 and lower 104 viewing zones. The corridor 106 provides a zone of low surface astigmatism having a refractive power which varies from that of the distance viewing zone 102 to that of the lower viewing zone 104. In the present example the corridor extends between the distance reference point (DRP) and the near reference point (NRP). A line 114 (shown dashed) extends downwardly from the near reference point NRP. In the present case, the line 114 is a fitted line which is fitted to horizontal mid-points between the 0.5 D nasal and temporal astigmatism contours 116, 118 adjacent to the lower viewing zone 104. In the present case the line 114 is shown as a vertical line. However, it will be appreciated that the line 114 may be tilted or inclined to align with the eye-path of the wearer.

The lower or near viewing zone 104 is positioned so as be suitable for a wearer's near vision tasks. The addition power of the lower viewing zone 104 at the near reference point (NRP) may provide a reduced accommodative demand when viewing near objects through that zone 104. The lower viewing zone 104 may thus reduce accommodative demand for near vision tasks and provide an amount of compensation for the relative hyperopic shift in the peripheral near vision.

In the illustrated embodiment, the lens element 100 also includes peripheral regions 108 disposed on either side of the lower viewing zone 104 so as to be located immediately adjacent thereto. Each peripheral region 108 includes a respective zone 120, 122 of positive power relative to the addition power of the lower viewing zone 104. The lower viewing zone 104 interposes the peripheral regions 108, and thus the respective zones 120, 122 of relative positive power.

Each zone 120, 122 of relative positive power has a distribution of mean addition power which provides an optical correction for retarding or arresting myopia for a wearer and which is suitable for a wearer's peripheral near vision requirements. Each zone 120, 122 of relative positive power will typically exhibit a low to medium range of positive power relative to the addition power of the lower viewing zone 104.

Each zone of relative positive power 120,122 is disposed immediately adjacent to lower viewing zone 104.

The upper viewing zone 102, the lower viewing zone 104, and the corridor 106 will typically have a relatively low surface astigmatism compared to the surface astigmatism of the peripheral regions 108.

The zones 120, 122 of relative positive power in the peripheral regions 108 provide a stimulus for retarding or arresting myopia associated with a peripheral region of the retina by providing an optical correction for the wearer's peripheral vision. Such an arrangement may be more effective in retarding or even arresting progression of myopia, particularly in children, than conventional myopia control lenses.

The positive mean power in the zones 120, 122 of relative positive power in the peripheral regions 108 may be selected based on optical correction requirements expressed in terms of clinical measurements that characterise the wearer's peripheral correction requirements, that is, the optical correction required to correct a wearer's peripheral vision. Any suitable technique may be used to obtain those requirements including, but not limited to, peripheral Rx data or ultrasound A-Scan data. Such data may be obtained through the use of devices that are known in the art, such as an open field autorefractor (for example, a Shin-Nippon open field auto-refractor).

EXAMPLE 1

Figure 2:
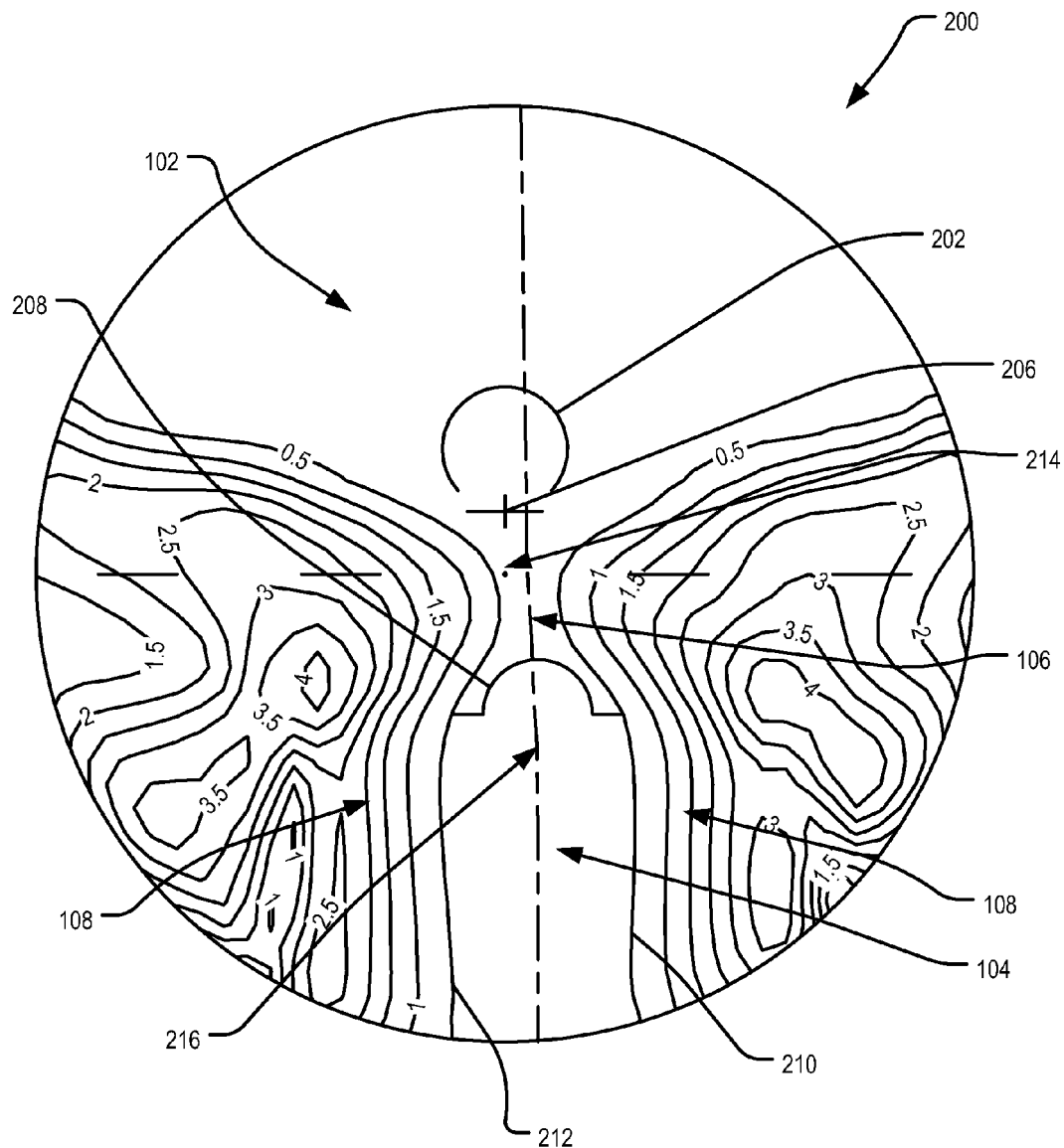
FIG. 2 is a contour plot of surface astigmatism for an ophthalmic lens element according to a first embodiment of the present invention.
Figure 3:
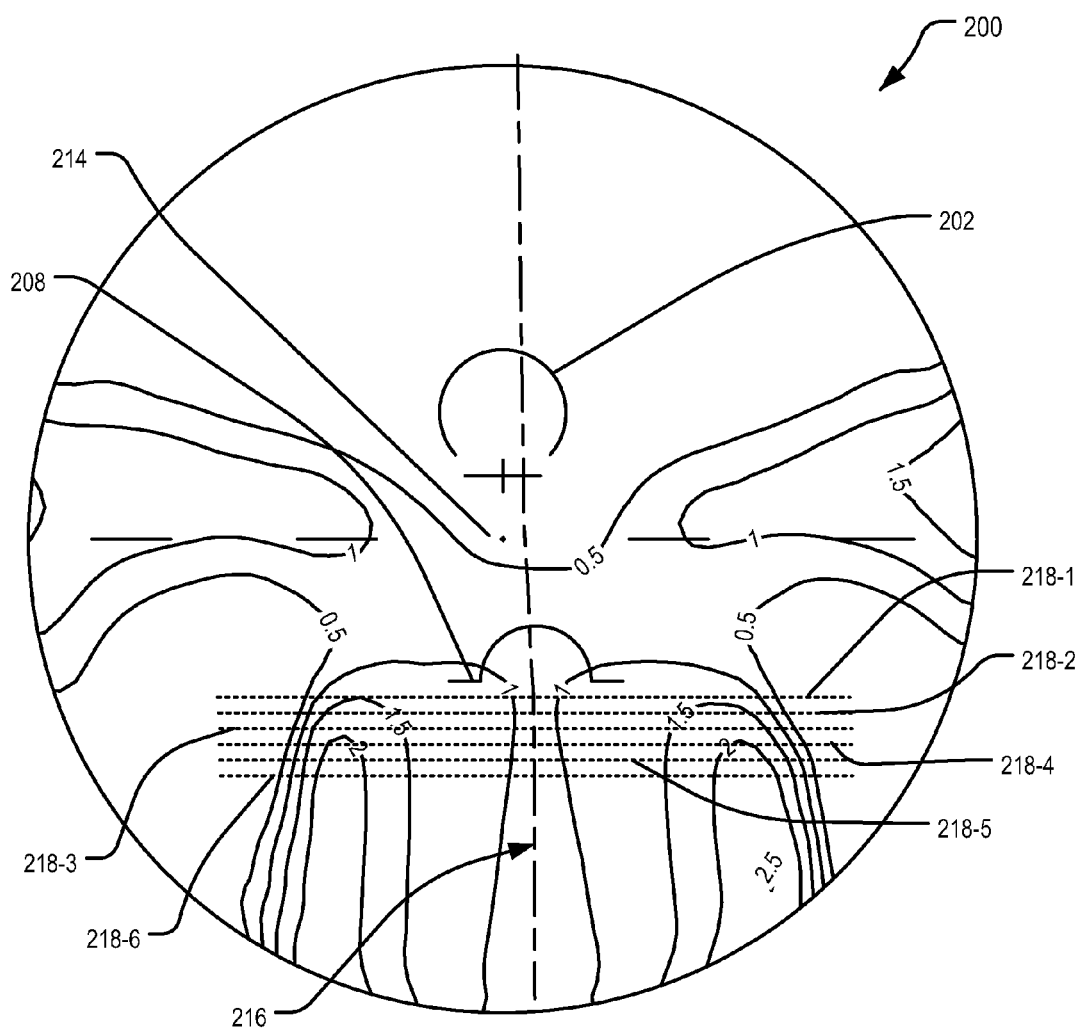
FIG. 3 is a contour plot of mean surface addition power for the ophthalmic lens element of FIG. 2.

FIG. 2 is a contour plot of surface astigmatism for the front surface (that is, the object side surface) of an ophthalmic lens element 200 according to an embodiment. FIG. 3 is a contour plot of mean surface addition power for the front surface of the ophthalmic lens element 200.

With reference to FIG. 2 and FIG. 3, the ophthalmic lens element 200 was designed having a base curve of 2.75 D in 1.530 index measured at the distance reference point (DRP), shown here as located at the centre of part-circle 202. The geometric centre (GC) for lens element 200 is identified at point 214. The fitting cross (FC) is designated with a marking 206 (shown here as a cross). Semi-circle 208 is centred on the near reference point (NRP).

The ophthalmic lens element 200 shown in FIG. 2 and FIG. 3 is a front surface progressive addition lens having a distance reference point (DRP) located about 8 mm above the geometric centre (GC) 214, and a fitting cross (FC) 206 located at about 4 mm above the geometric centre 214. The diameter of the contour plots is 60 mm on the lens front surface projected to a plane perpendicular to the lens front surface normal at the geometric centre 214.

As shown in FIG. 2, the 0.5 D astigmatic contours 210, 212 define a region of low surface astigmatism including the upper or distance viewing zone 102, the lower or near viewing zone 104, and the corridor 106. The ophthalmic lens element 200 provides a relatively wide upper viewing zone 102, and a relatively narrow lower viewing zone 104 positioned below the upper viewing zone 102 and connected thereto via the corridor 106. Peripheral regions 108 are disposed on each side of, and immediately adjacent to, the lower viewing zone 104 so that the lower viewing zone 104 interposes the zones of relative positive power. As will be explained below, each peripheral region 108 includes a zone of positive power relative to the addition power.

The ophthalmic lens element 200 provides a nominal addition power of +1.00 D in the lower viewing zone 104 starting at a distance of about 9 mm below the geometric centre 214 (GC). The near reference point (NRP) is inset horizontally by about 2.1 mm nasally relative to the geometric centre 214 (GC), the fitting cross (FC) and the distance reference point (DRP).

Figure 4:
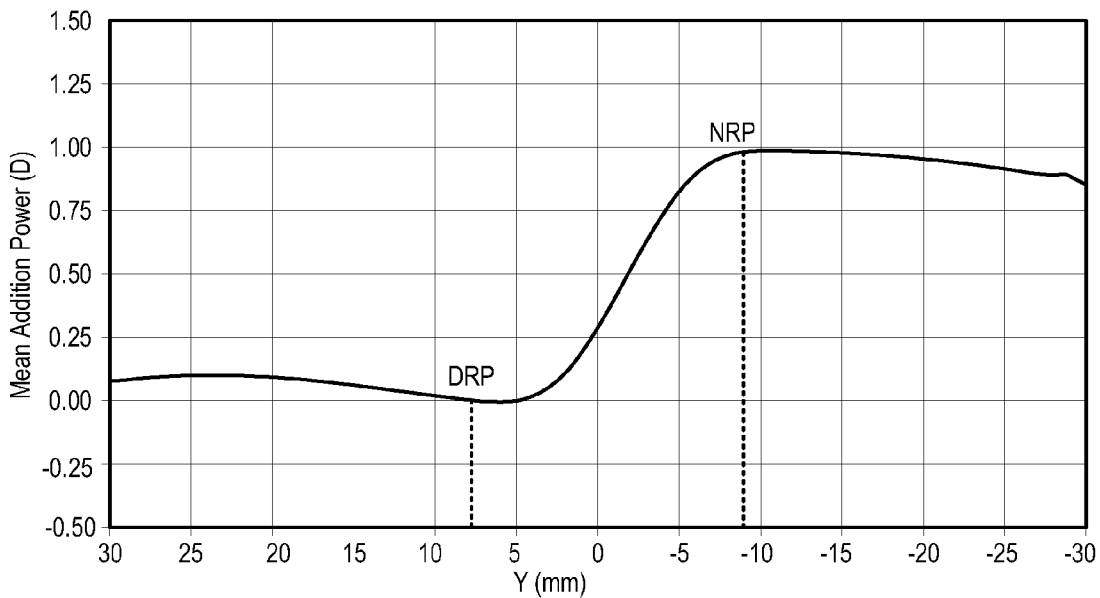
FIG. 4 is a plot of mean surface addition power for the ophthalmic lens element of FIG. 2 along an eye path shown in FIG. 2.

FIG. 4 is a plot of front surface addition mean power along an eye path marked by the approximate vertical line 216 on the astigmatism contour plot shown in FIG. 2. In the present case, line 216 is a line fitted to horizontal mid-points between the 0.5 D astigmatic contours 210, 212 adjacent to the lower viewing zone 104. Note that the mean addition power above the distance reference point (DRP) and below the near reference point (NRP) is not constant so as to ensure stable optical through power in those zones for the prescription of −2.50 D with +1.00 D addition, the lens back vertex point being 27 mm from the centre of rotation of the eye and the lens pantoscopic tilt angle at the fitting cross being 7° relative to the vertical plane, while the horizontal tilt angle at the FC was equal to 0°.

Figure 5:
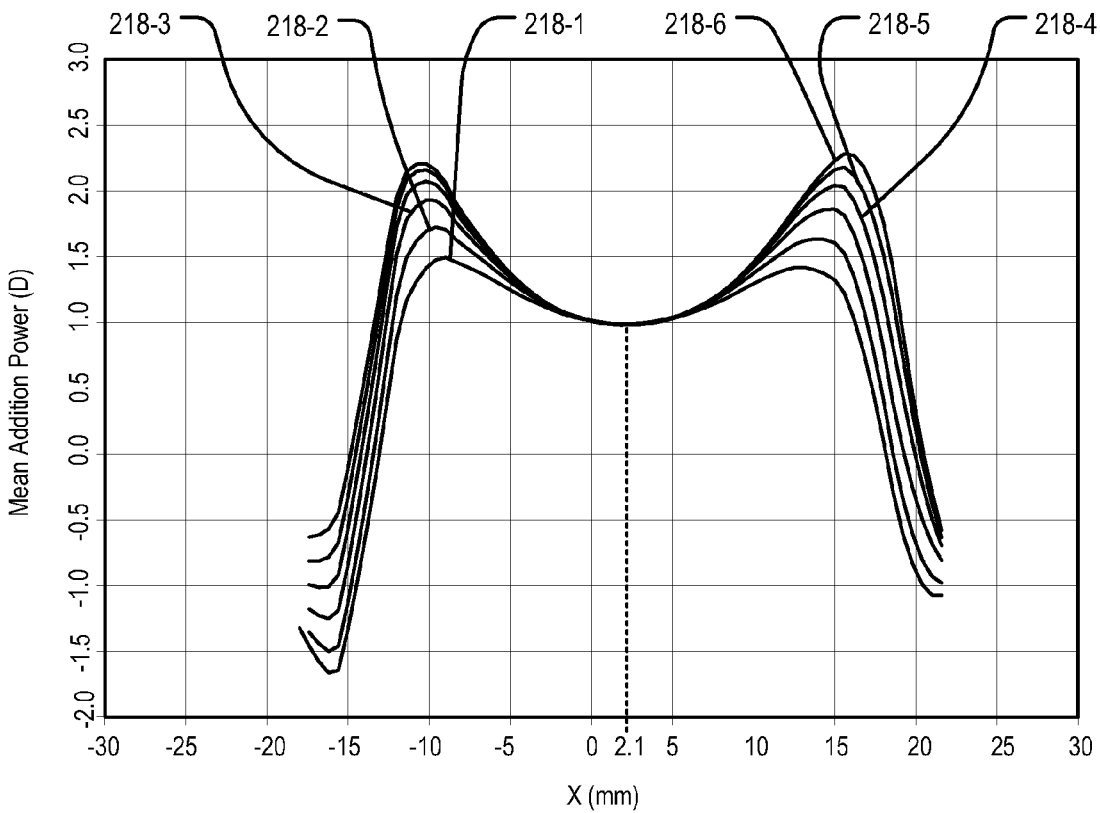
FIG. 5 shows plots of mean surface addition power for the ophthalmic lens element of FIG. 2 along plural horizontal lines shown in FIG. 3.

FIG. 5 shows the horizontal front surface mean addition power profiles for a sequence of six straight horizontal lines 218-1, 218-2, 218-3, 218-4, 218-5, 218-6 shown (dashed) in FIG. 3 which extend 20 mm on either side of the section of the line 216 which extends through the lower viewing zone 104, and which thus extend across the lower viewing zone 104 and the peripheral regions 108 of the lens element 200.

As shown in FIG. 5, along each line 218-1, 218-2, 218-3, 218-4, 218-5, 218-6 (ref. FIG. 5) the ophthalmic lens element 200 exhibits a respective mean addition power profile which includes a respective peak magnitude in each peripheral region 108 and a local minimum magnitude which is disposed substantially on the line 216 (at X=2.1 mm). Each mean addition power profile exhibits a monotonic increase in magnitude from the local minimum magnitude to the respective peak magnitudes.

Although in this example the sequence of straight horizontal lines 218-1, 218-2, 218-3, 218-4, 218-5, 218-6 are located below the near reference point (NRP), it is possible that a similar mean addition power profile may be provided along a horizontal line intersecting the near reference point (NRP) and extending a predefined distance across the lower viewing zone 104 and the peripheral regions 108, in which case the local minimum magnitude will be located at the near reference point (NRP).

The sequence of straight lines are placed vertically at 10 mm (218-1), 11 mm (218-2), 12 mm (218-3), 13 mm (218-4), 14 mm (218-5) and 15 mm (218-6) below the geometric centre (GC), meaning that line 218-6 is thus located 23 mm below the distance reference point (DRP) of the lens element 200.

As shown in FIG. 5, the respective horizontal mean addition power profiles show an increase in mean addition power both temporally and nasally at distances (Y) between −10 mm and −15 mm below the geometric centre (GC). It is also clear from FIG. 3 that this trend in peripheral mean power extends all the way to the bottom of the ophthalmic lens element 200.

At the higher end of this range (that is, Y=−10 mm, corresponding with line 218-1) the mean addition power increases by about 0.5 D (relative to the corresponding power on the eye path represented by line 216) at the horizontal distance of approximately 11 mm from the intersection of line 218-1 and the fitted line 216 (ref. FIG. 2) representing the eye-path, while at the lower end of the range (that is, Y=−15 mm, corresponding to line 218-6) the mean addition power increases by up to 1.25 D (relative to the corresponding power on the eye path represented by line 216) at the horizontal distance of approximately 14 mm from the intersection of the line 218-6 and the fitted line 216 (ref. FIG. 2) representing the eye-path. In the present example, the respective peak magnitudes in mean addition power are laterally separated by between about 22 mm (line 218-1) and about 27 mm (line 218-6).

EXAMPLE 2

Figure 6:
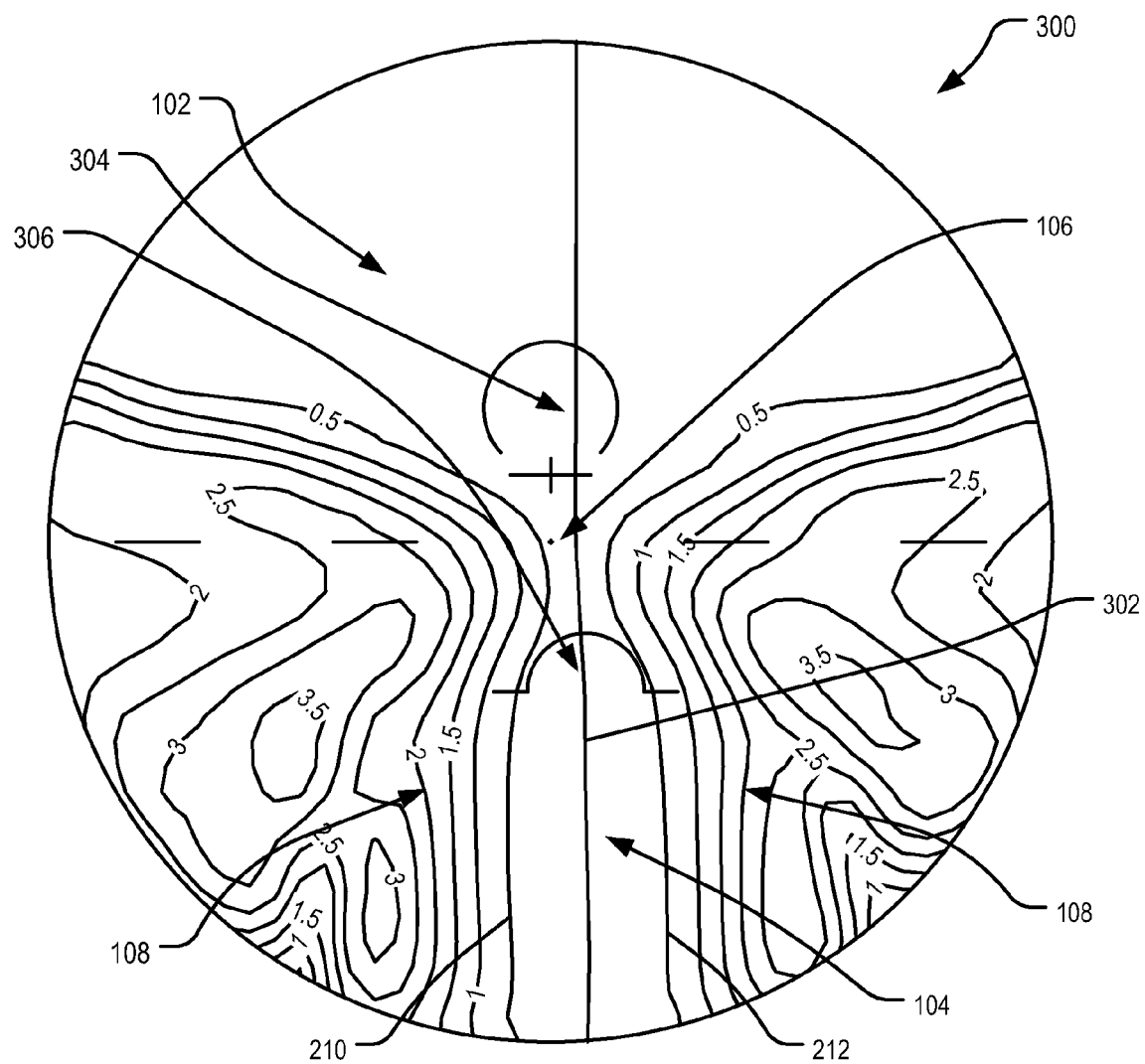
FIG. 6 is a contour plot of surface astigmatism for an ophthalmic lens element according to a second embodiment of the present invention.
Figure 7:
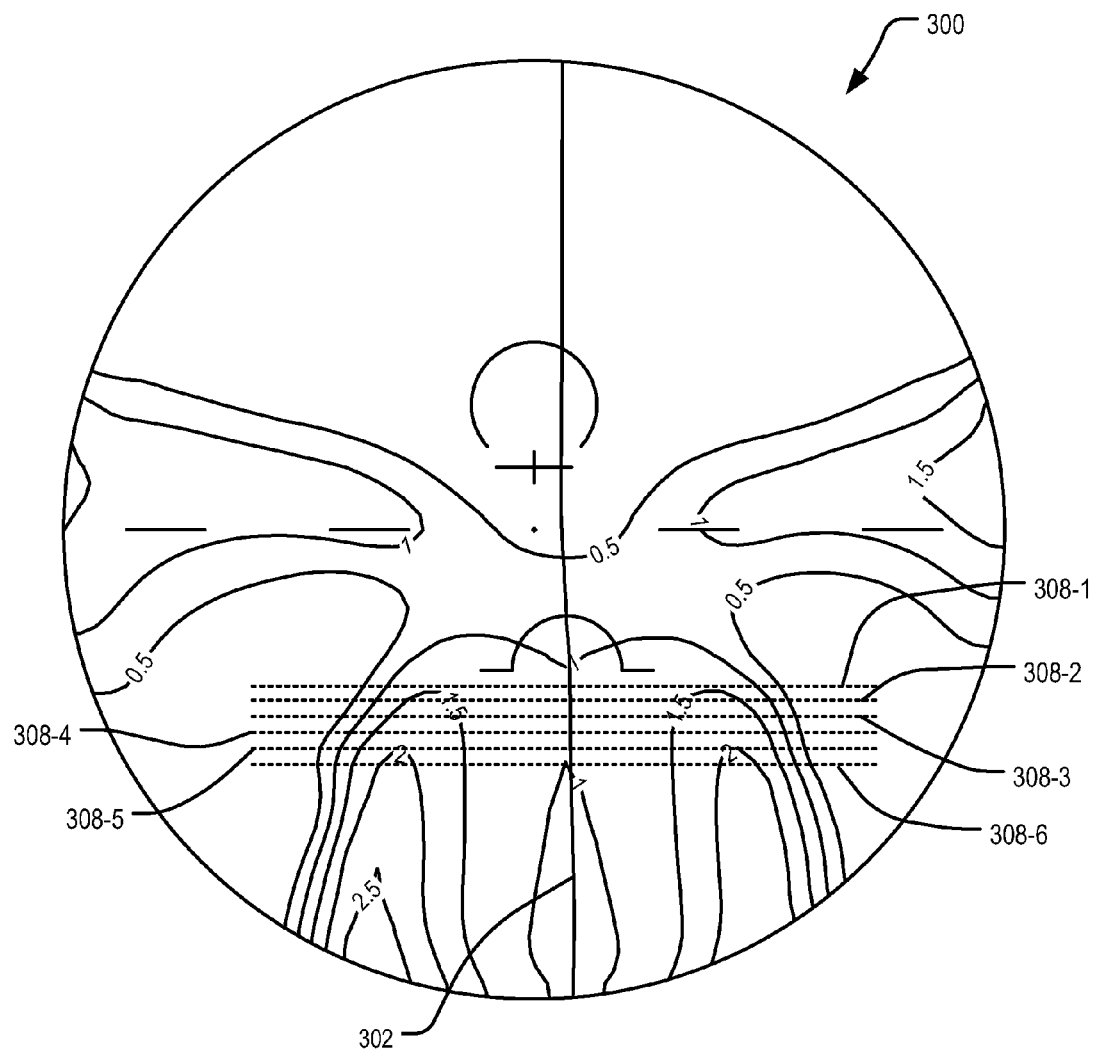
FIG. 7 is a contour plot of mean surface addition power for the ophthalmic lens element of FIG. 6.

FIG. 6 is a contour plot of surface astigmatism for the front surface (that is, the object side surface) of an ophthalmic lens element 300 according to a second embodiment of the present invention. FIG. 7 is a contour plot of mean surface addition power for the front surface of the ophthalmic lens element 300 shown in FIG. 6.

The ophthalmic lens element 300 shown in FIG. 6 and FIG. 7 is also a front surface progressive lens having the same location of the main reference points (DRP, FC and NRP) relative to geometric centre (GC) as the ophthalmic lens element 200 of the above-described example.

The ophthalmic lens element 300 also has the same base curve of 2.75 D (in 1.530 index) at the distance reference point (DRP). Thus, with reference to FIG. 6 and FIG. 7 it is evident that the ophthalmic lens element 300 is generally similar to the ophthalmic lens 200 described with reference to FIG. 2 and FIG. 3. For example, the ophthalmic lens element 200 and the ophthalmic lens element 300 each include a relatively short corridor 106, aspherisation of the upper 102 and lower 104 viewing zones above the DRP 304 and below the NRP 306, and laterally increasing mean surface power from a line 302 fitted to horizontal mid-points between the nasal and temporal 0.5 D astigmatism contours 210/212 adjacent to the lower viewing zone 104. In this example the addition power of the lower viewing zone 104 is also +1.00 D. However, the lower viewing zone 104 of ophthalmic lens element 300 is narrower than the lower viewing zone 104 of ophthalmic lens element 200 with the horizontal distance between the peaks of relative positive or "plus" power along the line 308-6 in FIG. 9 being around 22 mm.

Figure 8:
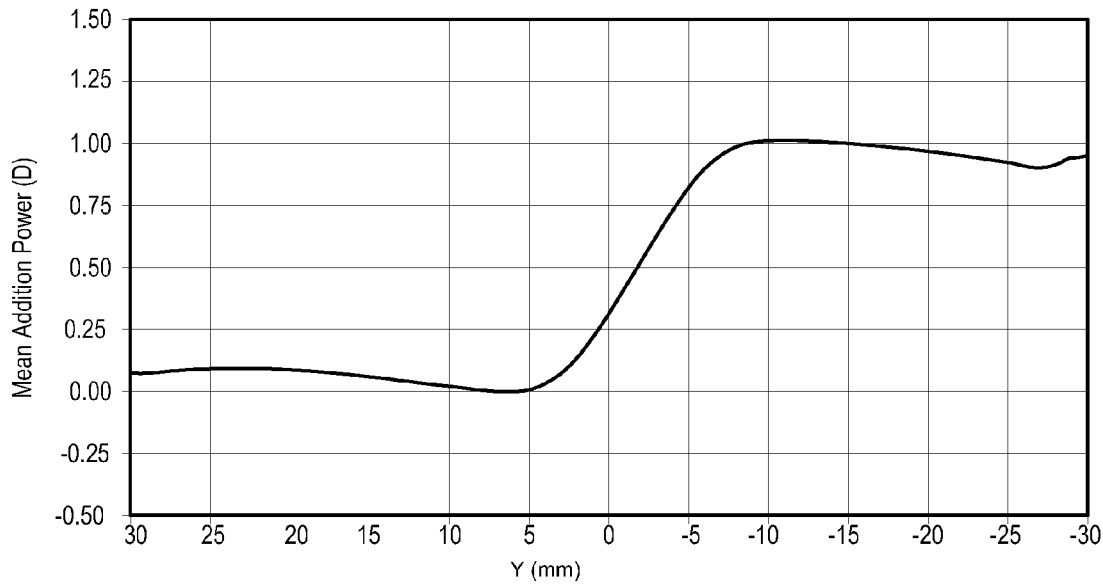
FIG. 8 is a plot of mean surface addition power for the ophthalmic lens element of FIG. 6 along an eye path shown in FIG. 6.

FIG. 8 is a plot of front surface addition mean power along an eye path marked by the approximate vertical line 302 on the astigmatism contour plot shown in FIG. 6.

Figure 9:
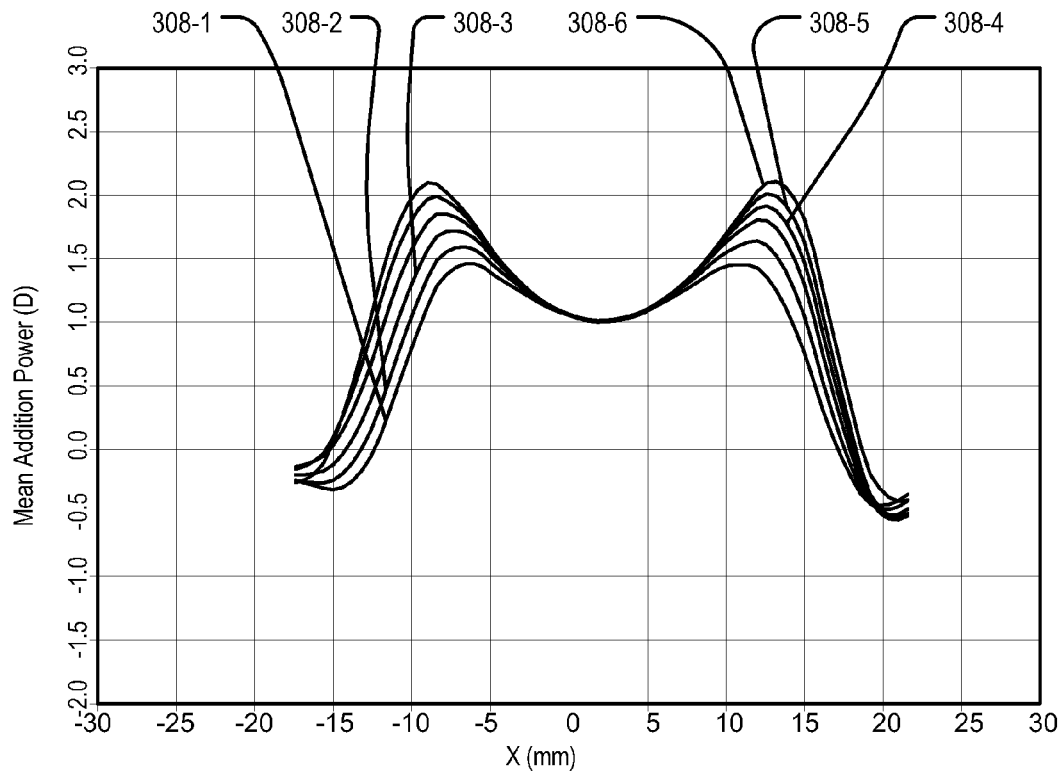
FIG. 9 shows plots of mean surface addition power for the ophthalmic lens element of FIG. 6 along plural horizontal lines shown in FIG. 7.

FIG. 9 shows the horizontal front surface mean addition power profiles for a sequence of six straight horizontal lines 308-1, 308-2, 308-3, 308-4, 308-5, 308-6 shown (dashed) in FIG. 7 which extend 20 mm on either side of the section of the line 302 which extends through the lower viewing zone 104, and which thus extend across the lower viewing zone 104 and the peripheral regions 108 of the lens element 300. The sequence of straight lines are placed vertically at 10 mm (308-1), 11 mm (308-2), 12 mm (308-3), 13 mm (308-4), 14 mm (308-5) and 15 mm (308-6) below the geometric centre (GC), meaning that line 308-6 is thus located 23 mm below the distance reference point (DRP) of the lens element 300.

Aside from the difference the width of the lower viewing zone, and with reference now to FIG. 8 and FIG. 9, further differences from the earlier described example include the extent and magnitude of the relatively plus power laterally from the vertical mid-line 302 of the lower viewing zone 104. For example, as shown in FIG. 9 at the height of Y=−10 mm (ref. FIG. 7, line 308-1), the maximum relative plus power in the peripheral regions 108 laterally occurs at around 9 mm from the eye path represented by line 302 and with the magnitude of 0.5 D. At the lower end of the range at Y=−15 mm (ref. FIG. 7, line 308-6) the magnitude of the relative positive power is around +1.1 D and occurs around 11 mm from the eye path.

The ophthalmic lens element 300 thus has the same addition power as the previous example but includes a "tighter" zone over which peripheral near vision has compensation for the hyperopic shift. In other words, the lateral separation between the peak magnitudes in the addition power profile (ref. FIG. 9) in each peripheral region 108 is reduced as compared with the lateral separation between the corresponding peak magnitudes in the addition power profile (ref. FIG. 5) for lens element 200. For example, in lens element 300 at 15 mm (ref. FIG. 3, line 308-6) below the geometric centre (GC) the lateral separation between the respective peak magnitudes in mean addition power is about 22 mm (ref. FIG. 9, profile for line 308-6), whereas the corresponding respective peak magnitudes in mean addition power for lens element 200 are laterally separated by about 27 mm (ref. FIG. 5, profile 218-6). Both ophthalmic lens element 200 and ophthalmic lens element 300 are designed to provide the nominal addition power in 1.6 index material.

EXAMPLE 3

Figure 10:
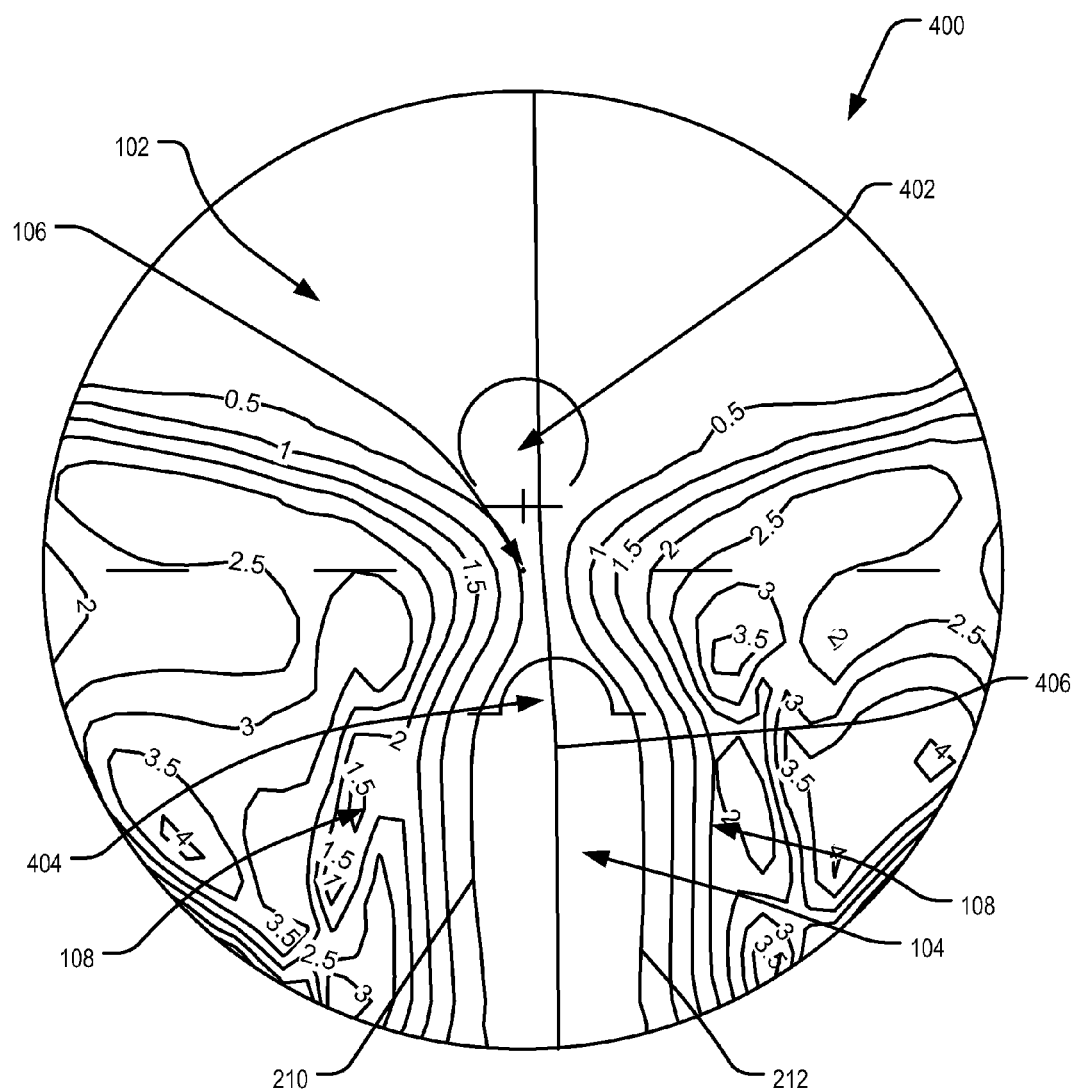
FIG. 10 is a contour plot of surface astigmatism for an ophthalmic lens element according to a third embodiment of the present invention.
Figure 11:
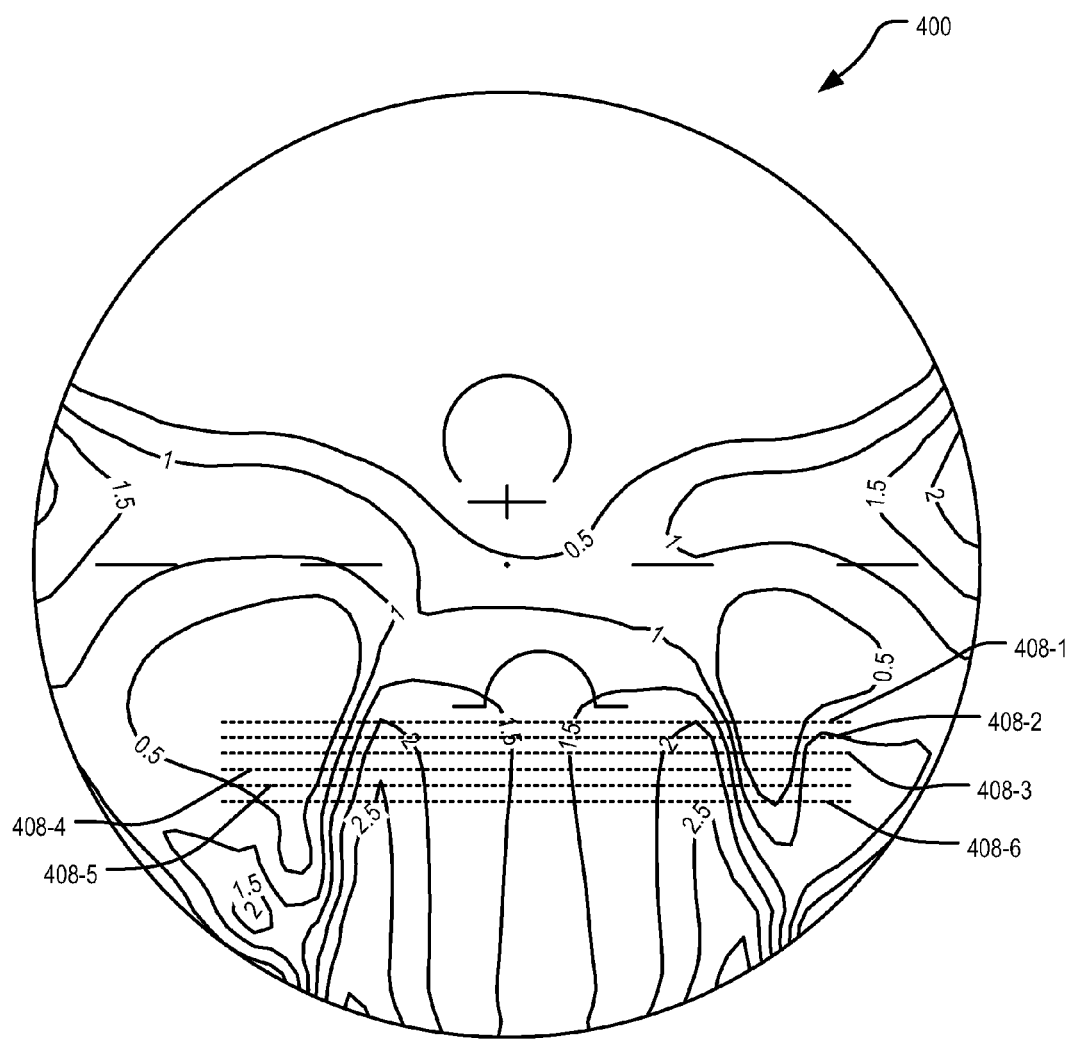
FIG. 11 is a contour plot of mean surface addition power for the ophthalmic lens element of FIG. 10.

FIG. 10 is a contour plot of surface astigmatism for the front surface (that is, the object side surface) of an ophthalmic lens element 400 according to a third embodiment of the present invention. FIG. 11 is a contour plot of mean surface addition power for the front surface of the ophthalmic lens element 400 shown in FIG. 6.

The ophthalmic lens element 400 shown in FIG. 10 and FIG. 11 is also a front surface progressive lens having the same location of the main reference points (DRP, FC and NRP) relative to geometric centre (GC) as the ophthalmic lens element 200 of the above-described example.

The ophthalmic lens element 400 also has the same base curve of 2.75 D (in 1.530 index) at the distance reference point 402 (DRP). Thus, with reference to FIG. 10 and FIG. 11 it is evident that the ophthalmic lens element 400 is generally similar to the ophthalmic lens 200 described with reference to FIG. 2 and FIG. 3. For example, the ophthalmic lens element 200 and the ophthalmic lens element 400 each include a relatively short corridor 106, aspherisation of the upper 102 and lower 104 viewing zones above the DRP 402 and below the NRP 404, and laterally increasing mean surface power from a line 406 fitted to horizontal mid-points between the nasal and temporal 0.5 D astigmatism contours 210/212 adjacent to the lower viewing zone 104. However, in this example the addition power of the lower viewing zone 104 is approximately +1.50 D.

Figure 12:
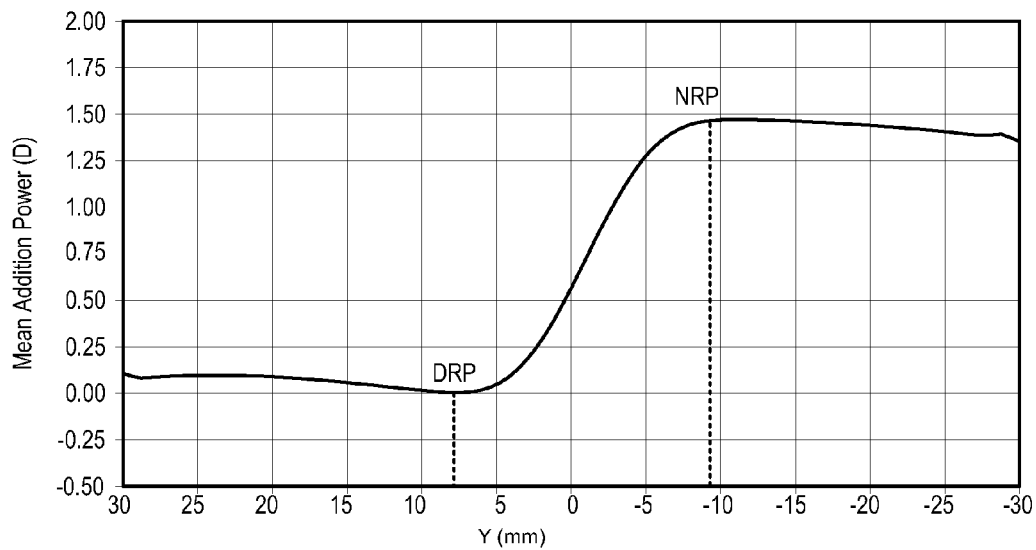
FIG. 12 is a plot of mean surface addition power for the ophthalmic lens element of FIG. 10 along an eye path shown in FIG. 10.

FIG. 12 is a plot of front surface addition mean power along an eye path marked by the approximate vertical line 406 on the astigmatism contour plot shown in FIG. 10.

Figure 13:
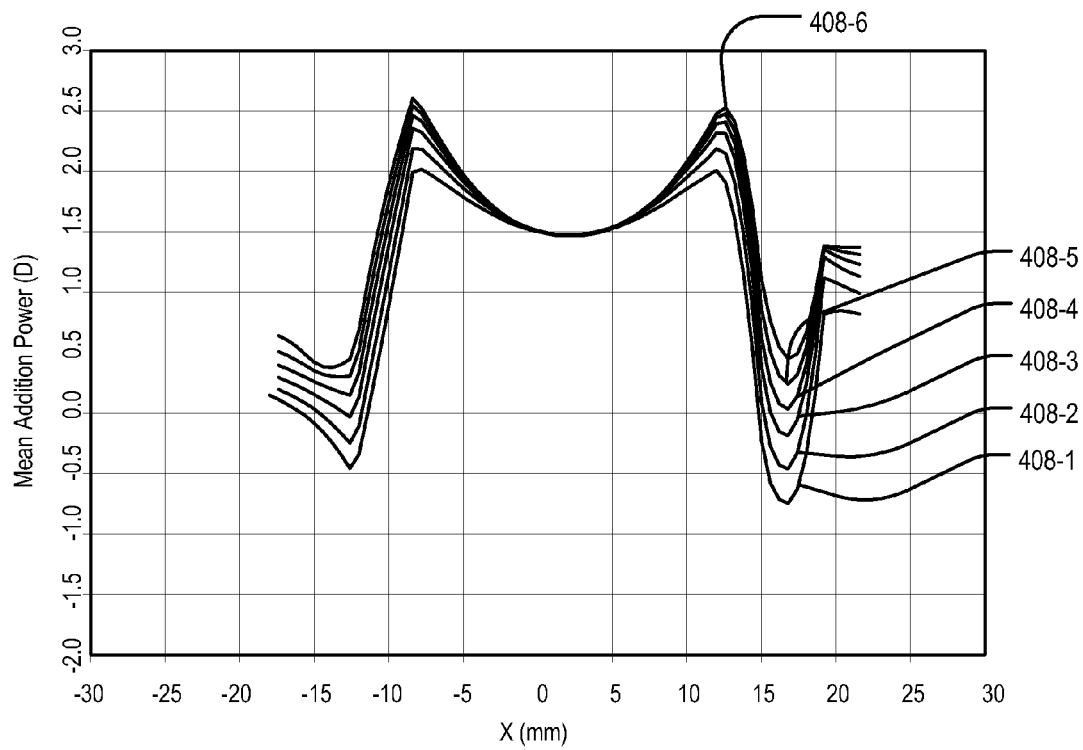
FIG. 13 shows plots of mean surface addition power for the ophthalmic lens element of FIG. 10 along plural horizontal lines shown in FIG. 11.

FIG. 13 shows the horizontal front surface mean addition power profiles for a sequence of six straight horizontal lines 408-1, 408-2, 408-3, 408-4, 408-5, 408-6 shown (dashed) in FIG. 11 which extend 20 mm on either side of the section of the line 406 which extends through the lower viewing zone 104, and which thus extend across the lower viewing zone 104 and the peripheral regions 108 of the lens element 400. The sequence of straight lines are placed vertically at 10 mm (408-1), 11 mm (408-2), 12 mm (408-3), 13 mm (408-4), 14 mm (408-5) and 15 mm (408-6) below the geometric centre (GC), meaning that line 408-6 is thus located 23 mm below the distance reference point (DRP) of the lens element 400.

Aside from the difference in addition power, and with reference now to FIG. 12 and FIG. 13, further differences from the earlier described example include the extent and magnitude of the relatively plus power laterally from the vertical mid-line 406 of the lower viewing zone 104. For example, as shown in FIG. 9 at the height of Y=−10 mm (ref. FIG. 13, line 408-1), the maximum relative plus power in the peripheral regions 108 laterally occurs at around 10 mm from the eye path and with the magnitude of 0.5 D. At the lower end of the range at Y=−15 mm (ref. FIG. 13, line 408-2) the magnitude of the relative positive power is around +1.1 D and occurs also around 10 mm from the eye path.

The ophthalmic lens element 400 thus has a relatively higher addition power than the two earlier examples and a "tighter" zone over which peripheral near vision has compensation for the hyperopic shift compared to Example 1. In this example, as shown in FIG. 13, the lateral separation between the locations of the peak relative positive or "plus" power along the line 408-6 is about 21 mm compared to 27 mm along the corresponding line 218-6 (ref. FIG. 5) in Example 1. The addition power is 1.5 D compared to 1.0 D in Example 1. Both ophthalmic lens element 200 and ophthalmic lens element 400 are designed to provide the nominal addition power in 1.6 index material.

EXAMPLE 4

Figure 14:
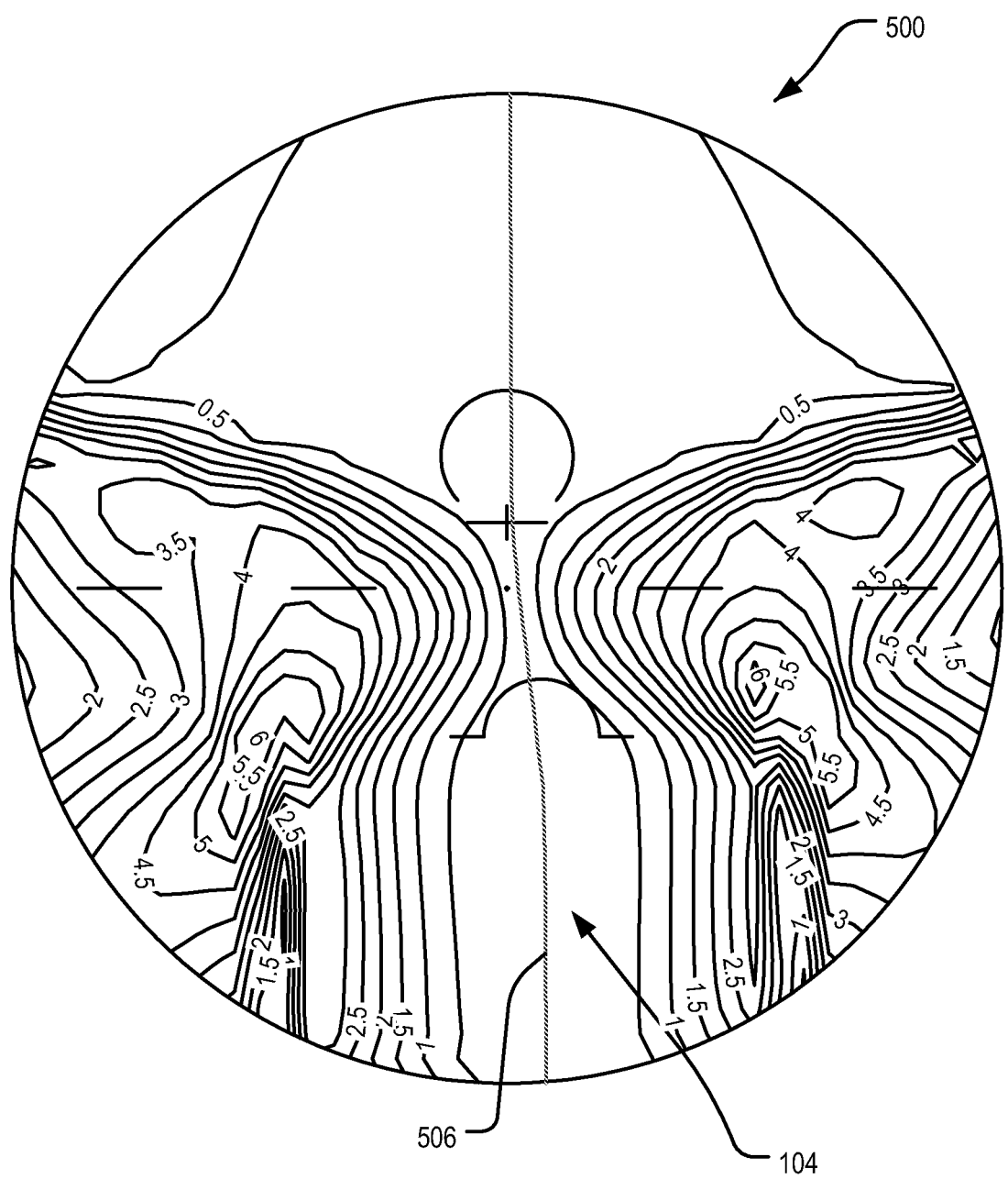
FIG. 14 is a contour plot of surface astigmatism for an ophthalmic lens element according to a fourth embodiment of the present invention.
Figure 15:
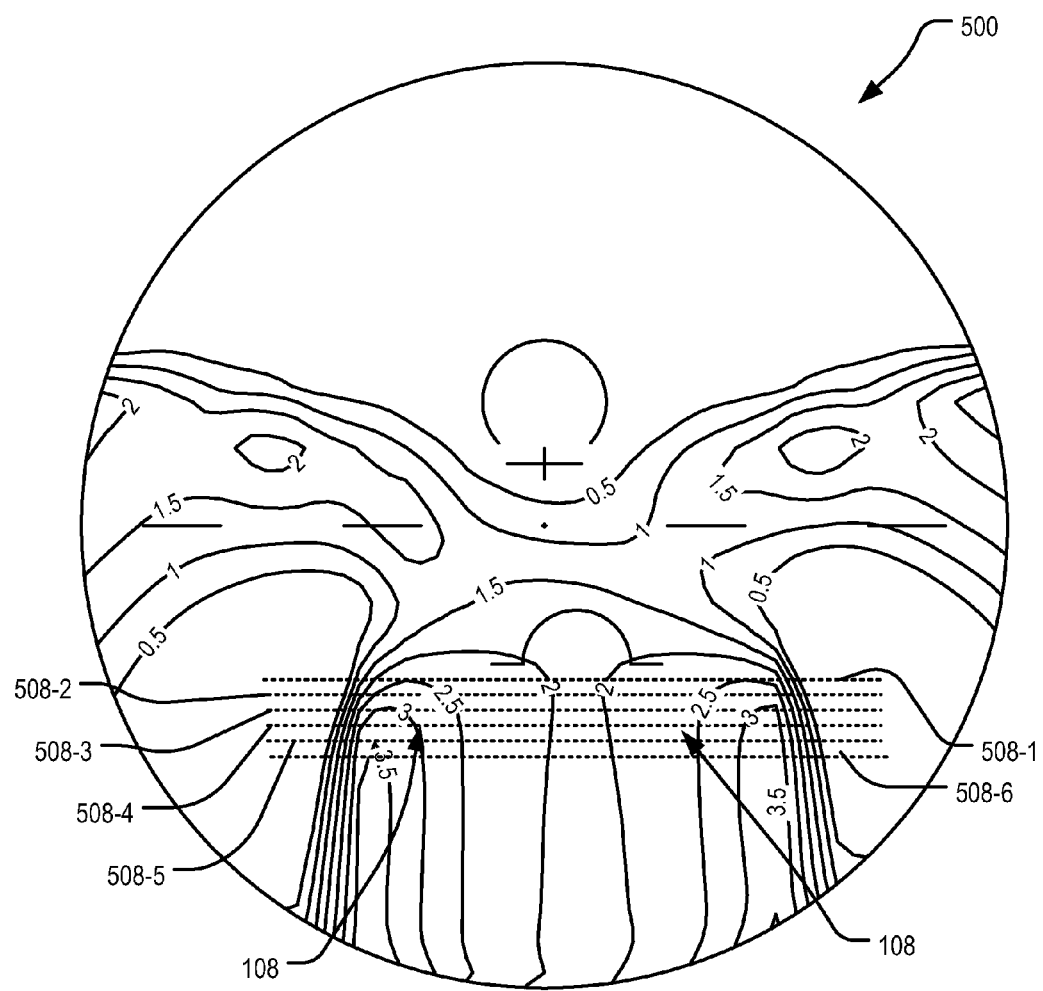
FIG. 15 is a contour plot of mean surface addition power for the ophthalmic lens element of FIG. 14.

FIG. 14 is a contour plot of surface astigmatism for the front surface (that is, the object side surface) of an ophthalmic lens element 500 according to a fourth embodiment of the present invention. FIG. 15 is a contour plot of mean surface addition power for the front surface of the ophthalmic lens element 500 shown in FIG. 14.

The ophthalmic lens element 500 shown in FIG. 14 and FIG. 15 is a front surface progressive with a short corridor length (DRP to NRP of 17 mm, FC to NRP of 13 mm). The ophthalmic lens element 500 has the same base curve of 2.75 D in 1.530 index as the earlier described examples. However, the ophthalmic lens element 500 shown in FIG. 14 and FIG. 15 provides an addition power of +2.0 D in the material index of 1.6.

Figure 16:
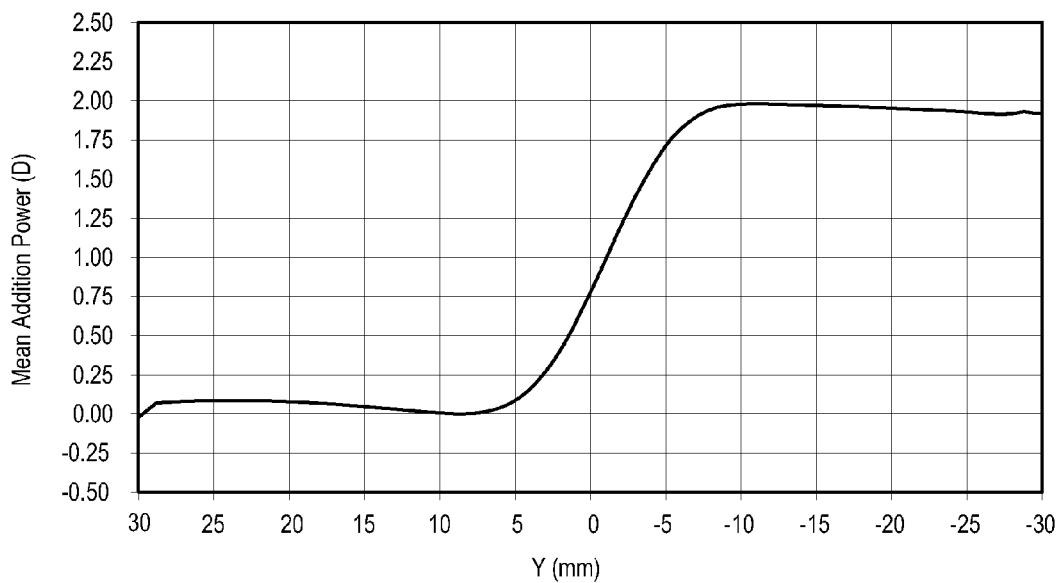
FIG. 16 is a plot of mean surface addition power for the ophthalmic lens element of FIG. 14 along an eye path shown in FIG. 14.

FIG. 16 is a plot of front surface addition mean power along an eye path marked by the approximate vertical line 506 on the astigmatism contour plot shown in FIG. 10.

Figure 17:
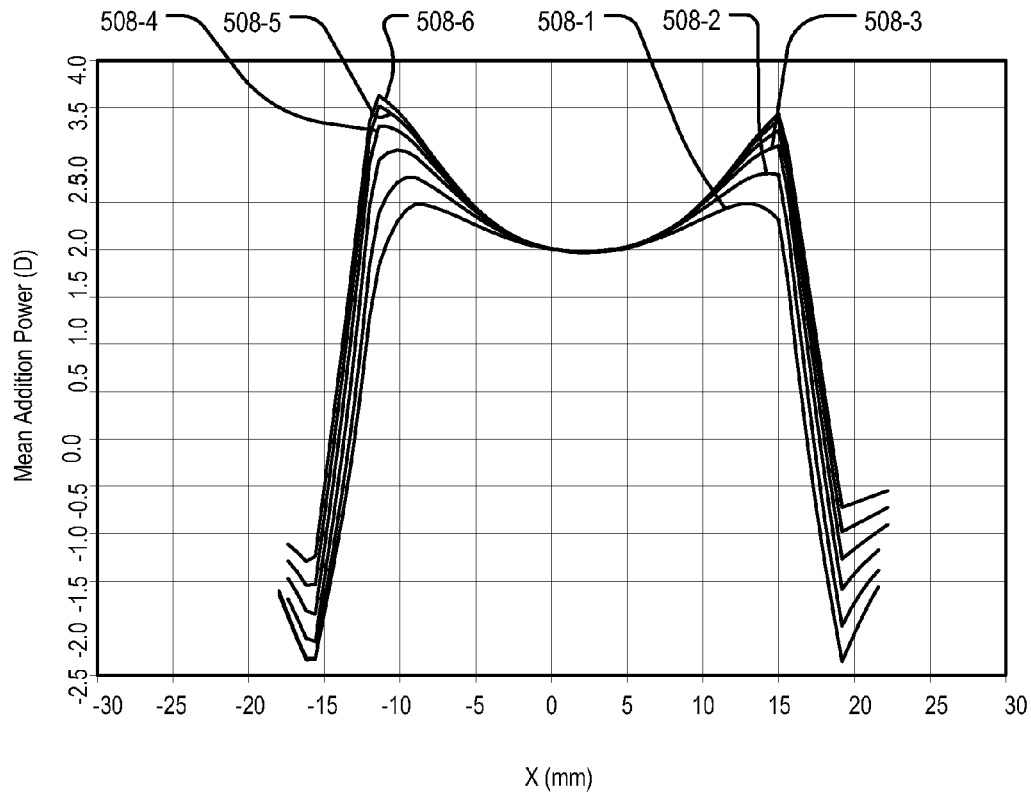
FIG. 17 shows plots of mean surface addition power for the ophthalmic lens element of FIG. 14 along plural horizontal lines shown in FIG. 15.

FIG. 17 shows the horizontal front surface mean addition power profiles for a sequence of six straight horizontal lines 508-1, 508-2, 508-3, 508-4, 508-5, 508-6 shown (dashed) in FIG. 15 which extend 20 mm on either side of the section of the line 506 which extends through the lower viewing zone 104, and which thus extend across the lower viewing zone 104 and the peripheral regions 108 of the lens element 500. The sequence of straight lines are placed vertically at 10 mm (508-1), 11 mm (508-2), 12 mm (508-3), 13 mm (508-4), 14 mm (508-5) and 15 mm (508-6) below the geometric centre (GC), meaning that line 508-6 is thus located 23 mm below the distance reference point (DRP) of the lens element 500.

As is shown in FIG. 17, the peak magnitude of the relatively positive power in the peripheral regions 108, and thus the peripheral near vision plus power compensation of this ophthalmic lens element 500, reaches up to approximately +1.5 D on both nasal and temporal sides at Y=−15 mm (ref. FIG. 15, line 508-2) and extends out to around 13 mm to 14 mm on either side of the substantially vertical line 506 fitted to horizontal mid-points between nasal and temporal 0.5 D astigmatism contours adjacent to the lower viewing zone 104.

EXAMPLE 5

The ophthalmic lens elements described in the above examples are progressive addition lens elements having a complex surface, in the form of a progressive power surface, on the front (that is, the object side) of the lens elements and a simple surface, in the form of a spherical surface, on the rear (that is, the object side) of the lens element. However, it is also possible that other embodiments of the present invention may provide progressive addition lens elements having a progressive power surface on the back (that is, the eye side) of the lens element. Alternatively, optical lens elements according to other embodiments of the present invention may include progressive addition lens elements which provide a power progression split between the front and back surfaces with both surfaces contributing to the provision of addition power.

Figure 18:
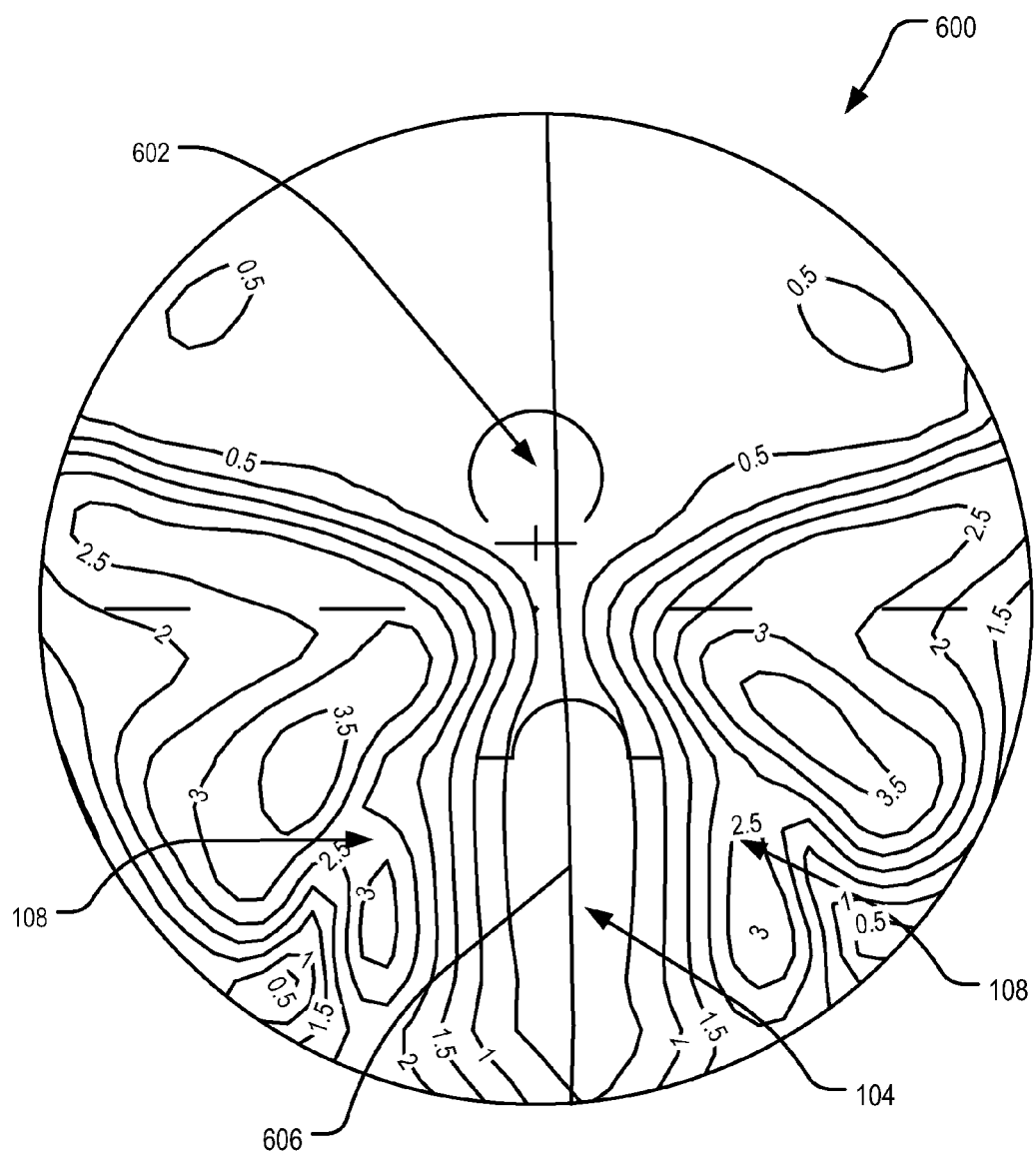
FIG. 18 is a contour plot of surface astigmatism for an ophthalmic lens element according to a fifth embodiment of the present invention.

FIG. 18 is a contour plot of surface astigmatism for the back surface (that is, the eye side surface) of an ophthalmic lens element 600 according to a fifth embodiment of the present invention.

Figure 19:
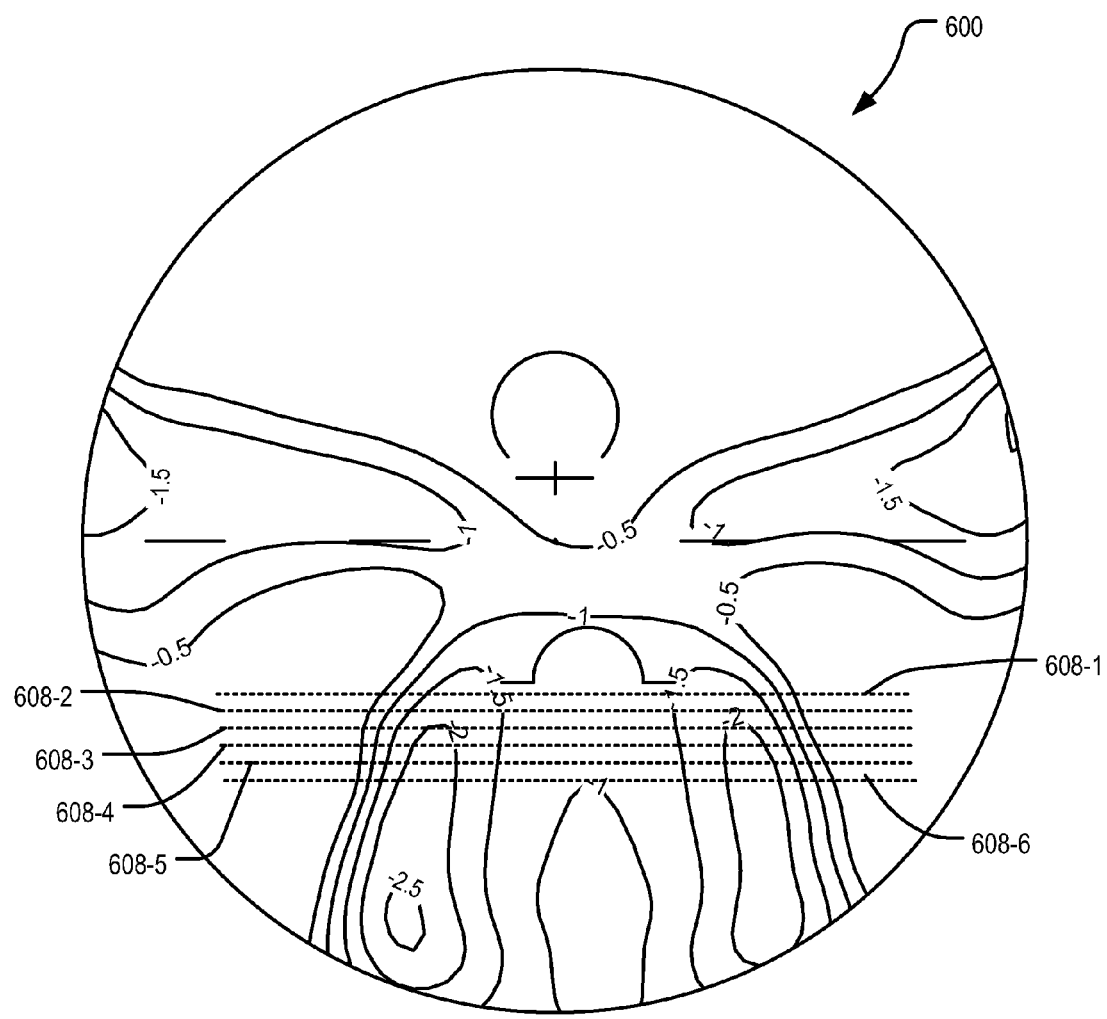
FIG. 19 is a contour plot of mean surface addition (digression) power for the ophthalmic lens element of FIG. 18.

FIG. 19 is a contour plot of mean surface addition power for the back surface of the ophthalmic lens element 600 shown in FIG. 18. In the lens element 600, the progressive surface is disposed on the back (eye side) surface the lens element 600, while the front surface is spherical.

Figure 20:
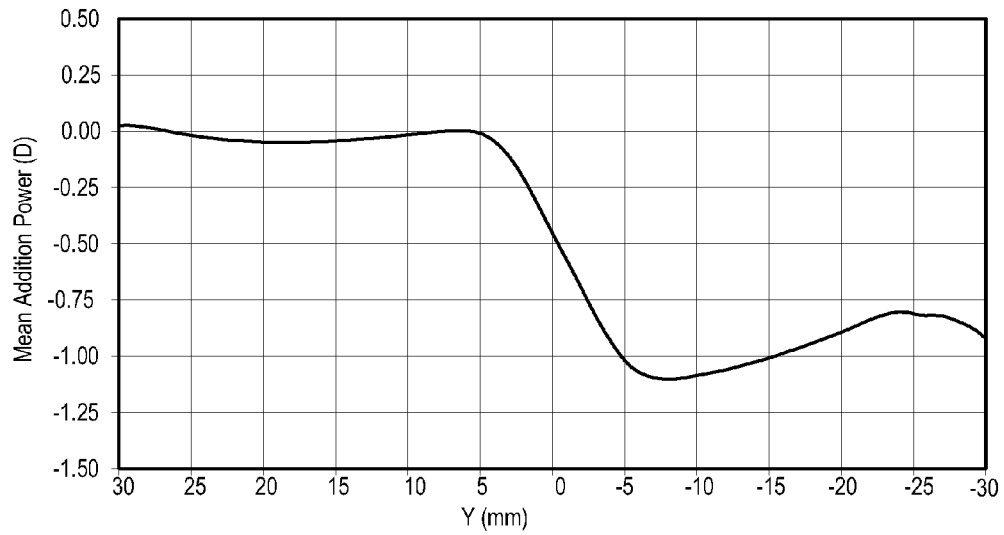
FIG. 20 is a plot of mean surface addition (digression) power for the ophthalmic lens element of FIG. 18 along an eye path shown in FIG. 18.

FIG. 20 is a plot of back surface addition (digression) mean power along an eye path marked by the approximate vertical line 606 on the astigmatism contour plot shown in FIG. 18.

Figure 21:
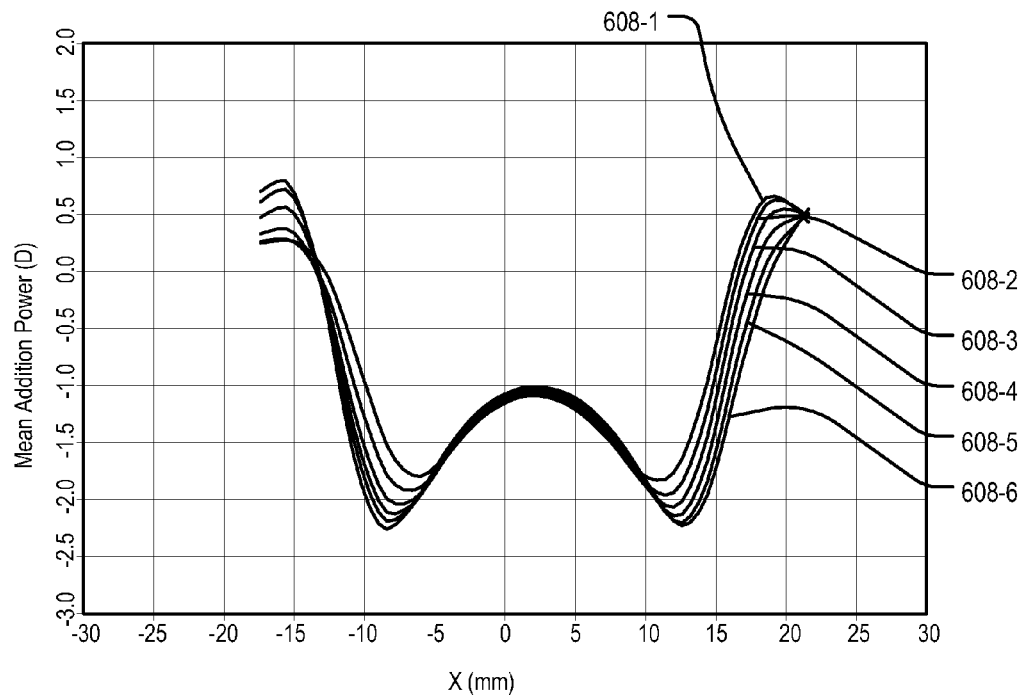
FIG. 21 shows plots of mean surface addition (digression) power for the ophthalmic lens element of FIG. 18 along plural horizontal lines shown in FIG. 19.

FIG. 21 shows the horizontal back surface mean addition (digression) power profiles for a sequence of six straight horizontal lines 608-1, 608-2, 608-3, 608-4, 608-5, 608-6 shown (dashed) in FIG. 19 which extend 20 mm on either side of the section of the line 606 which extends through the lower viewing zone 104, and which thus extend across the lower viewing zone 104 and the peripheral regions 108 of the lens element 600. The sequence of straight lines are placed vertically at 10 mm (608-1), 11 mm (608-2), 12 mm (608-3), 13 mm (608-4), 14 mm (608-5) and 15 mm (608-6) below the geometric centre (GC), meaning that line 608-6 is thus located 23 mm below the distance reference point (DRP) of the lens element 600.

The lens element 600 is substantially similar to the lens element 300 (ref. FIG. 6) described in relation to example 2, at least in terms of its optical characteristics, except that the location of the complex surface (that is, the progressive surface) and the simple surface (that is, the spherical surface) is reversed. Because the optical effect provided by the lens element 300 (ref. FIG. 6) and the lens element 600 is substantially the same, in the as worn position lens element 600 and lens element 300 may be virtually indistinguishable to the wearer and would each provide substantially the same addition power and relative peripheral plus power.

In this example, the ophthalmic lens element 600 has a back surface curve of 3.00 D (in 1.530 index) at the distance reference point 602 (DRP). As can be seen in FIG. 20, the lower viewing zone 104 of this ophthalmic lens has a power digression on the back (eye side) surface of the lens element 600. Such a power digression provides addition power when looking through the lens element 600 that has a spherical front surface and a complex digressive back surface.

As shown in FIG. 21, the addition power in the lower viewing zone 104 and the relative positive or "plus" power in the peripheral regions 108 adjacent to the lower viewing zone 104 of this lens is substantially similar to that provided by the lens element 300 (ref. FIG. 6) but is achieved with a different surface configuration. For example, the peripheral regions 108 adjacent to the lower viewing zone 104 on the back surface show a relative minus surface on the back (eye side) surface of the lens element.

Embodiment of the present invention may provide a peripheral near vision plus power compensation which corrects the peripheral hyperopic shift during near vision tasks and which thus reduces or prevents myopia progression.

Although the above embodiments have been described in terms of progressive ophthalmic lens elements, it will be appreciated that the present invention may also be applicable to other forms of multi-focal lens elements, such as bifocal lens elements. Finally, it will be understood that there may be other variations and modifications to the configurations described herein that are also within the scope of the present invention.

The invention claimed is:

1. A progressive ophthalmic lens element including:
an upper viewing zone having a distance reference point and a fitting cross, the upper viewing zone providing a first refractive power for distance vision;
a lower viewing zone for near vision, the lower viewing zone providing an addition power relative to the first refractive power;
a corridor connecting the upper and lower zones, the corridor having a refractive power varying from that of the upper viewing zone to that of the lower viewing zone; and
a peripheral region disposed on each side of the lower viewing zone, each peripheral region including a zone of positive power relative to the addition power to provide therein a positive refractive power relative to the refractive power of the lower viewing zone;
wherein the zones of relative positive power are disposed immediately adjacent to the lower viewing zone such that the lower viewing zone interposes the zones of relative positive power.

2. A progressive ophthalmic lens element according to claim 1 wherein along any horizontal line disposed at least 18 mm below the distance reference point and extending across the lower viewing zone and the peripheral regions, the lens element exhibits a positive mean addition power profile which includes a respective peak magnitude in each peripheral region and a minimum magnitude in the lower viewing zone.

3. A progressive ophthalmic lens element according to claim 2 wherein the respective peak magnitudes are offset laterally from a line fitted to horizontal mid-points between nasal and temporal 0.5 D astigmatism contours adjacent to the lower viewing zone, said offset being less than 10 mm.

4. A progressive ophthalmic lens element according to claim 2 wherein the respective peak magnitudes are offset laterally from a line fitted to horizontal mid-points between nasal and temporal 0.5 D astigmatism contours adjacent to the lower viewing zone, said offset being less than 15 mm.

5. A progressive ophthalmic lens element according to claim 2 wherein each mean addition power profile exhibits a monotonic increase in magnitude from the minimum magnitude to the respective peak magnitudes.

6. A progressive ophthalmic lens element according to claim 2 wherein the mean addition power profile along a horizontal line 18 mm below the distance reference point exhibits respective peak magnitudes of at least 0.5 D greater than the addition power.

7. A progressive ophthalmic lens element according to claim 2 wherein the mean addition power profile along a horizontal line 23 mm below the distance reference point exhibits respective peak magnitudes of at least 0.5 D greater than the addition power.

8. A progressive ophthalmic lens element according to claim 2 wherein the mean addition power profile along a horizontal line 23 mm below the distance reference point exhibits respective peak magnitudes of at least 1.0 D greater than the addition power.

9. A progressive ophthalmic lens element according to claim 2 wherein the mean addition power profile along a horizontal line 23 mm below the distance reference point exhibits respective peak magnitudes of at least 1.5 D greater than the addition power.

10. A progressive ophthalmic lens element according to claim 2 wherein the mean addition power profile along a horizontal line 23 mm below the distance reference point exhibits respective peak magnitudes of at least 2.0 D greater than the addition power.

11. A progressive ophthalmic lens element according to claim 1 wherein the distance reference point is located about 8 mm above the geometric centre of the lens.

12. A progressive ophthalmic lens element according to claim 5 wherein the respective peak magnitudes are laterally separated by at least about 20 mm.

13. A progressive ophthalmic lens element according to claim 5 wherein the respective peak magnitudes are laterally separated by at least about 25 mm.

14. A progressive ophthalmic lens element according to claim 5 wherein the respective peak magnitudes are laterally separated by at least about 30 mm.

15. A progressive ophthalmic lens element according to claim 1 wherein within each zone of relatively positive power the magnitude of the relatively positive power monotonically increases laterally over a horizontal extent extending from a line fitted to horizontal mid-points between nasal and temporal 0.5 D astigmatism contours adjacent to the lower viewing zone to a peak magnitude which is at least 0.5 D greater than the addition power at the intersection of the fitted line and the horizontal line.

16. A progressive ophthalmic lens element according to claim 15 wherein the horizontal extent is less than 10 mm.

17. A progressive ophthalmic lens element according to claim 15 wherein the horizontal extent is less than 15 mm.

18. An ophthalmic lens element including:
an upper viewing zone providing a first refractive power for distance vision;
a lower viewing zone providing an addition power relative to the first refractive power; and
peripheral regions including a respective zone of relatively positive power compared to the addition power to provide therein a positive refractive power relative to the refractive power of the lower viewing zone;
wherein the lower viewing zone and the peripheral regions are arranged so that the lower viewing zone interposes the zones of relatively positive power.

19. An ophthalmic lens element according to claim 18 wherein the ophthalmic lens element includes a bi-focal ophthalmic lens element.

20. An ophthalmic lens element according to claim 18 wherein the ophthalmic lens element includes a progressive addition ophthalmic lens element.

21. A method for retardation of myopia progression, including providing to a patient spectacles bearing a pair of progressive ophthalmic lens elements, each lens element including a surface having:
an upper viewing zone having a distance reference point and a fitting cross, the upper viewing zone providing a first refractive power for distance vision;
a lower viewing zone for near vision, the lower viewing zone providing an addition power relative to the first refractive power;
a corridor connecting the upper and lower zones, the corridor having a refractive power varying from that of the upper viewing zone to that of the lower viewing zone; and
a peripheral region disposed on each side of the lower viewing zone, each peripheral region including a zone of positive power relative to the addition power to provide therein a positive refractive power relative to the refractive power of the lower viewing zone;

wherein the zones of relative positive power are disposed immediately adjacent to the lower viewing zone such that the lower viewing zone interposes the zones of relative positive power.

\* \* \* \* \*